US009191086B2

(12) United States Patent
Pochop et al.

(10) Patent No.: US 9,191,086 B2
(45) Date of Patent: Nov. 17, 2015

(54) METHODS AND APPARATUS FOR BALANCING BAND PERFORMANCE

(75) Inventors: Jeffrey L. Pochop, Los Gatos, CA (US); Michael T. Smith, Orinda, CA (US); Tash Hepting, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 539 days.

(21) Appl. No.: 13/538,557

(22) Filed: Jun. 29, 2012

(65) Prior Publication Data
US 2013/0155949 A1  Jun. 20, 2013

Related U.S. Application Data

(60) Provisional application No. 61/559,859, filed on Nov. 15, 2011.

(51) Int. Cl.
| H04B 7/04 | (2006.01) |
| H04B 7/10 | (2006.01) |
| H01Q 1/00 | (2006.01) |
| H01Q 21/24 | (2006.01) |
| H01Q 21/28 | (2006.01) |
| H01Q 5/40 | (2015.01) |

(52) U.S. Cl.
CPC ............. *H04B 7/0426* (2013.01); *H01Q 1/007* (2013.01); *H01Q 5/40* (2015.01); *H01Q 21/24* (2013.01); *H01Q 21/28* (2013.01); *H04B 7/10* (2013.01)

(58) Field of Classification Search
None
See application file for complete search history.

(56) References Cited

U.S. PATENT DOCUMENTS

| 6,195,063 B1 | 2/2001 | Gabriel et al. |
| 6,456,242 B1 | 9/2002 | Crawford |

(Continued)

FOREIGN PATENT DOCUMENTS

| CN | 101777704 A | 7/2010 |
| CN | 101826662 A | 9/2010 |

OTHER PUBLICATIONS

European Search Report for European Patent Application No. 12192536.6, mailed on Apr. 22, 2013, 6 pages.

(Continued)

*Primary Examiner* — Timothy J Weidner
(74) *Attorney, Agent, or Firm* — Cooley LLP

(57) ABSTRACT

An apparatus includes a processor disposed within an enclosure and configured to communicate with multiple wireless devices. A first and a second antenna are disposed within the enclosure. The first antenna is configured to operate within a first band, and the second antenna is configured to operate within a second band. The second band has a center frequency less than a center frequency of the first band. The first antenna is configured to send a signal having a signal strength at a wireless device and associated with the first band, and the second antenna is configured to send a signal having a signal strength at the wireless device and associated with the second band. The signal strength for the signal associated with the first band is greater than the signal strength associated with the second band such that the wireless device selects the first band to communicate with the processor.

23 Claims, 16 Drawing Sheets

(56) References Cited

U.S. PATENT DOCUMENTS

| | | | |
|---|---|---|---|
| 6,933,909 B2* | 8/2005 | Theobold | 343/893 |
| 7,348,930 B2 | 3/2008 | Lastinger et al. | |
| 7,417,591 B2* | 8/2008 | Iguchi et al. | 343/702 |
| 7,489,282 B2 | 2/2009 | Lastinger et al. | |
| 7,595,756 B2* | 9/2009 | Lastinger et al. | 343/700 MS |
| 7,642,961 B1* | 1/2010 | Rausch | 342/367 |
| 7,830,305 B2 | 11/2010 | Boling et al. | |
| 7,843,386 B2* | 11/2010 | Benavides | 342/360 |
| 7,948,446 B2 | 5/2011 | Barone | |
| 7,994,979 B2 | 8/2011 | Shimizu et al. | |
| 8,013,792 B2* | 9/2011 | McCarthy et al. | 342/375 |
| 8,928,529 B2* | 1/2015 | Kee et al. | 342/464 |
| 2004/0183726 A1 | 9/2004 | Theobold | |
| 2007/0279310 A1 | 12/2007 | Tsai et al. | |
| 2009/0174569 A1 | 7/2009 | Smith et al. | |
| 2010/0103066 A1 | 4/2010 | Shtrom et al. | |
| 2010/0227647 A1 | 9/2010 | Shimizu et al. | |
| 2010/0238075 A1 | 9/2010 | Pourseyed | |
| 2013/0162499 A1 | 6/2013 | Pochop, Jr. et al. | |

OTHER PUBLICATIONS

U.S. Appl. No. 61/559,863, entitled "Methods and Apparatus for Thermal Management in a Wireless Access Point," filed Nov. 15, 2011, 15 pages.

U.S. Appl. No. 13/538,545, entitled "Apparatus for Implementing Cross Polarized Integrated Antennas for MIMO Access Points," filed Jun. 29, 2012, 50 pages.

Juniper Networks, "WLA Series Wireless LAN Access Points WLA371*, WLA422, WLA522, WLA432, WLA532, WLA632*," Datasheet, Nov. 2011, 12 pages.

Office Action for Chinese Patent Application No. 201210459228.8, mailed on Dec. 1, 2014, 14 pages.

Office Action for U.S. Appl. No. 13/538,545, mailed on Mar. 11, 2014, 31 pages.

Office Action for U.S. Appl. No. 13/538,545, mailed on Jul. 28, 2014, 40 pages.

Office Action for U.S. Appl. No. 13/538,545, mailed on Jan. 16, 2015, 9 pages.

* cited by examiner

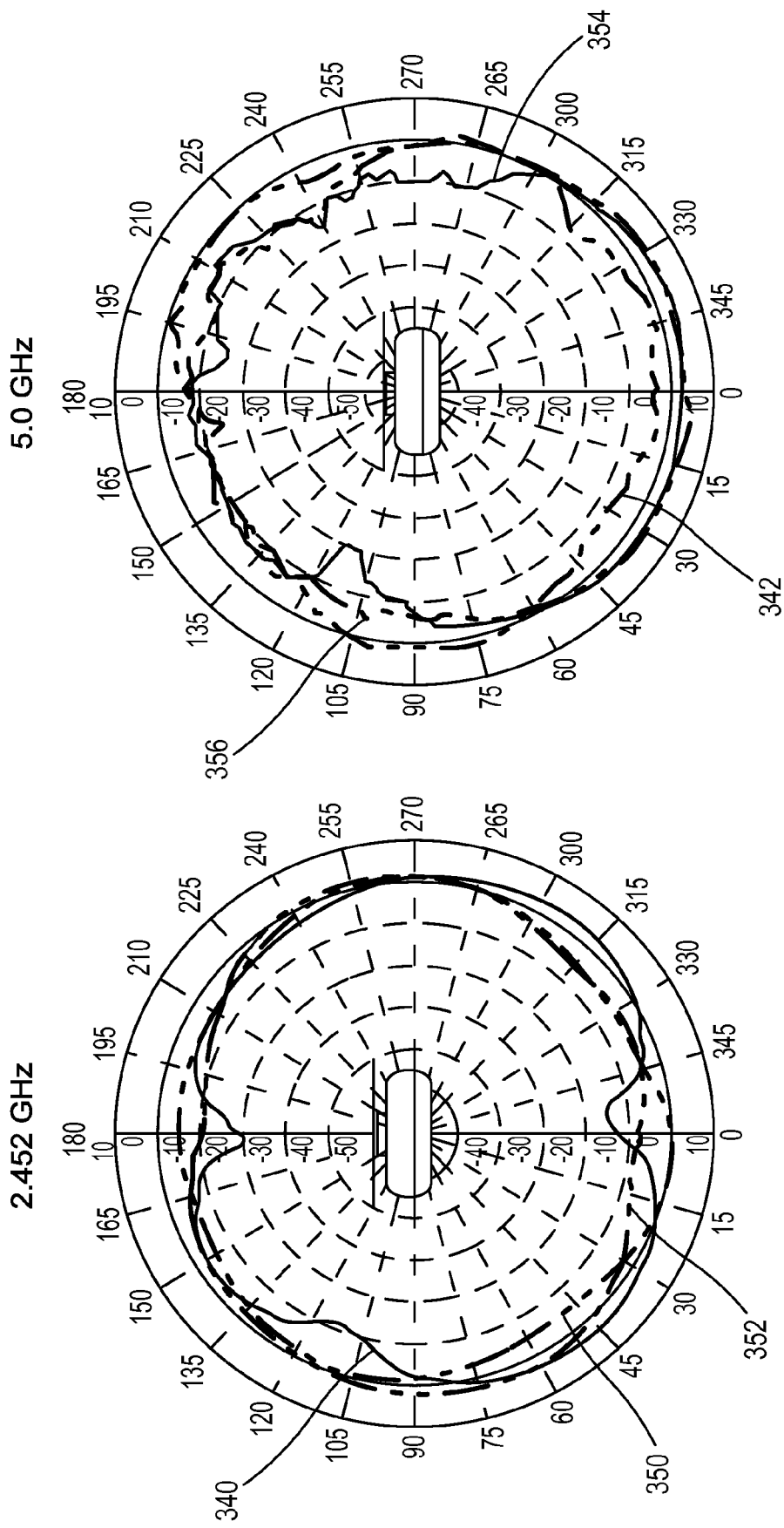

METHODS AND APPARATUS FOR BALANCING BAND PERFORMANCE

CROSS-REFERENCE TO RELATED APPLICATIONS

This application claims priority to and the benefit of U.S. Provisional Application Ser. No. 61/559,859, entitled "Methods and Apparatus for Balancing Band Performance, filed on Nov. 15, 2011, the disclosure of which is incorporated herein by reference in its entirety.

This application is also related to co-pending U.S. patent application Ser. No. 13/538,545 filed on Jun. 29, 2012, which claims priority to U.S. Provisional Application Ser. No. 61/559,854, filed on Nov. 15, 2011 both entitled "Methods and Apparatus for Implementing Cross Polarized Integrated Antennas for MIMO Access Points," filed on Nov. 15, 2012, and co-pending U.S. Provisional Application Ser. No. 61/559,863, entitled "Methods and Apparatus for Thermal Management in a Wireless Access Point," filed on Nov. 15, 2011, the disclosure of each of which is incorporated by reference herein in its entirety.

BACKGROUND

Some embodiments described herein relate generally to an apparatus for providing communications between wireless communication devices and a network, using, for example, a multiple input-multiple output (MIMO) access point device optimized to operate within a 5.0 GHZ band.

In a wireless local area network (WLAN), wireless communication devices can typically operate in the 2.4 GHz ISM (industrial, scientific and medical) band (e.g., 802.11b/g/n) and/or the 5.0 GHz band (e.g., 802.11a/n). The 2.4 GHz band is not only the most common for 802.11b/g wireless communication devices, but also populated by many consumer devices such as cordless phones, Bluetooth devices, and microwave ovens that all lead to reduced availability of network spectrum. As a result, wireless communication devices operating in the 2.4 GHz band often have to contend with additional network performance issues from a variety of sources. On the other hand, the 5.0 GHz band has more available channels and is generally used less than the 2.4 GHz band. Therefore, one solution to reduce contention for the busy 2.4 GHz band resource is to move or steer wireless communication devices capable of operating in the 5.0 GHz band to the 5.0 GHz band.

Some known dual band, dual radio access point devices are capable of supporting two different bands, such as, for example, a 2.4 GHz band (802.11b/g/n) and a 5.0 GHz band (802.11a/n) simultaneously. These access point devices can typically optimize the overall performance (e.g., in terms of throughput) for the two bands (e.g., 2.4 GHz band and the 5.0 GHz band). That is, a wireless communication device antenna gains and transmit power circuitry can be roughly performance balanced between the two bands (e.g., 2.4 GHz band and the 5.0 GHz band). Because signals in the 5.0 GHz band are attenuated roughly twice as much as signals in the 2.4 GHz band, by over the air (OTA) and through radio frequency (RF) obstacle signal attenuation, the OTA signals in the 5.0 GHz band are roughly half of the power at receivers as they are in the 2.4 GHz band. Thus, wireless communication devices typically experience lower performance in the 5.0 GHz band in many environments. As a result, wireless communication devices capable of operating in dual bands (e.g., 802.11n) typically resist steering or moving to the 5.0 GHz band, while generally choosing to communicate with these access point devices using the 2.4 GHz band.

Accordingly, a need exists for methods and apparatus to implement band steering at a dual band access point device, such that wireless communication devices can voluntarily choose to associate with that access point device using a higher center frequency band (e.g., 5.0 GHz band), thus to provide better throughput to those wireless communication devices operating in the higher center frequency spectrum, while also easing congestion for other wireless communication devices remaining in the lower center frequency (e.g., 2.4 GHz) spectrum.

SUMMARY

An apparatus includes a processor disposed within an enclosure and configured to communicate with multiple wireless devices including a wireless device. A first antenna is disposed within the enclosure and is configured to operate within a first band, and a second antenna is disposed within the enclosure at a non-zero distance from first antenna and is configured to operate within a second band. The second band has a center frequency less than a center frequency of the first band. The first antenna is configured to send a signal having a signal strength at the wireless device and associated with the first band, and the second antenna is configured to send a signal having a signal strength at the wireless device and associated with the second band. The signal strength for the signal associated with the first band is greater than the signal strength associated with the second band such that the wireless device selects the first band to communicate with the processor.

BRIEF DESCRIPTION OF THE DRAWINGS

FIG. 18 illustrates an example vertical-plane radiation pattern for the internal antennas of the wireless access point device of FIG. 14 that operate in the 2.4 GHz band; and FIG. 19 illustrates an example vertical-plane radiation pattern for the internal antennas of the wireless access point device of FIG. 14 that operate in the 5.0 GHz band.

DETAILED DESCRIPTION

Figure 1:
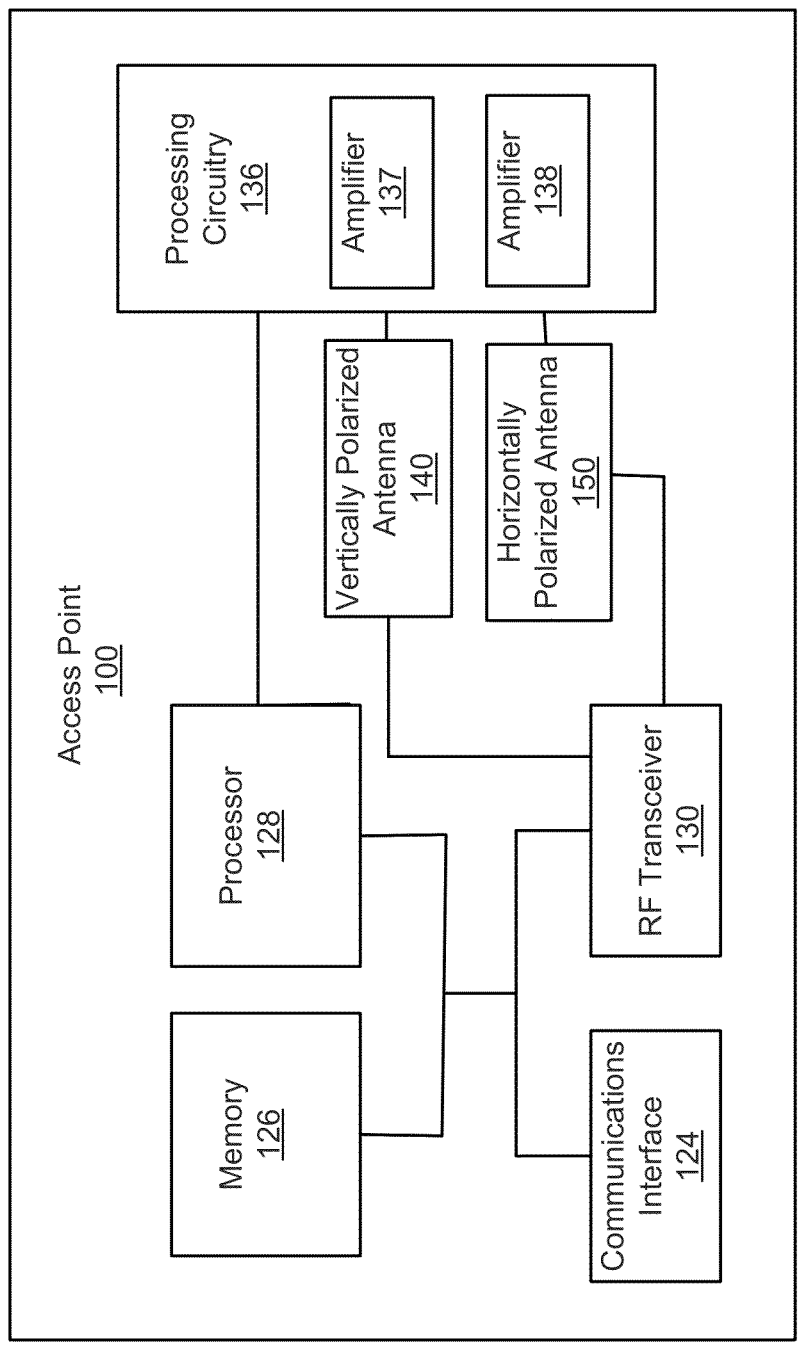
FIG. 1 is a schematic illustration of a wireless access point device, according to an embodiment

Apparatus and methods are described herein to implement band steering at a dual band MIMO access point device (e.g., a device that can operate in two different bands such as, for example, a 2.4 GHz band and a 5.0 GHz band) and/or a wireless communication device, such that the wireless communication device can voluntarily choose to associate with the access point device in the band that has a higher center frequency, for example, the 5.0 GHz band instead of the 2.4 GHz band. In some embodiments, power amplification techniques can be applied in processing circuitry of an access point device to increase the transmit power of the antennas within an access point device that have a higher center frequency than other antennas in the access point device. For example, amplifiers can be used to amplify a signal sent to, for example, 5.0 GHz antennas within an access point device with greater amplification than amplifiers used to amplify 2.4 GHz antennas of the same access point device. In some other embodiments, the gain of the 5.0 GHz antennas in the access point device is relatively greater than the gain of the 2.4 GHz antennas in the access point device.

Various methods and devices are described herein that can be implemented at dual band access point devices (also referred to herein as "access points") and/or wireless communication devices to move or steer a wireless communication device from a lower center frequency band (e.g., 2.4 GHz band) to a higher center frequency band (e.g., a 5.0 GHz band). These methods include, for example, a power amplification approach, an approach associated with increasing gains of antennas, and/or an approach for optimizing the location of the various antennas of an access point, to improve the performance of the higher center frequency band (e.g., 5.0 GHz band) antennas relative to that of lower center frequency (e.g., 2.4 GHz band) antennas in the same access point, as described in more detail below.

In some embodiments, internal cross-polarized antennas can be implemented in a small form-factor multi-stream MIMO access point. In such embodiments, each of the antennas can be positioned within the access point in, for example, a vertical polarization or a horizontal polarization. The MIMO access point can be a dual-radio access point, in that the internal antennas of the access point can operate in both the 2.4 GHz band and the 5.0 GHz band. The implementation of cross-polarized internal antennas typically involves considerations in various aspects, such as radio frequency (RF), thermal characteristics, mechanical mechanisms, electrical mechanisms, and/or the like.

As used herein, "associated with" can mean, for example, included in, physically located with, a part of, and/or operates or functions as a part of. Additionally, "associated with" can mean, for example, references, identifies, characterizes, describes, and/or sent from. For example, an orientation of polarization can be associated with an internal antenna of an access point and identifies, references and/or relates to the internal antenna. As used herein, the singular forms "a," "an" and "the" include plural referents unless the context clearly dictates otherwise. Thus, for example, the term "a wireless communication device" is intended to mean a single wireless communication device or a combination of wireless communication devices.

As used herein, the polarization of an antenna relates to the orientation of the electric field (E-plane) of an electromagnetic wave sent from or received by that antenna with respect to the Earth's surface and can be determined by the physical structure of the antenna and by its orientation. The use herein of the terms vertically-polarized antenna and horizontally-polarized antenna can refer to the structure of the antenna and/or to the orientation of the antenna within an access point. The orientation of the electric field of the electromagnetic wave (referred to herein as the orientation of polarization) of both a vertically-polarized antenna and a horizontally-polarized antenna can be horizontal, vertical, or at an angle in-between horizontal and vertical, depending on the antenna's orientation within the access point. An antenna with an orientation of polarization that is vertical can send and receive electromagnetic waves orthogonal to electromagnetic waves of an antenna with an orientation of polarization that is horizontal. It should be understood that although many embodiments described herein include vertically-polarized antenna(s) and horizontally-polarized antenna(s), other embodiments can include different or additional antennas with different polarizations such as circular polarization and/or elliptical polarization.

As used herein, the term "omnidirectional antenna" can refer to an antenna which radiates electromagnetic wave power uniformly in all directions in one plane, with the radiated power decreasing with elevation angle above or below the plane. An omnidirectional antenna as described herein can also refer an antenna which radiates electromagnetic wave power substantially in all directions in one plane.

As used herein the term "antenna gain" refers to, for example, an antenna's power gain, and can combine the antenna's directivity and electrical efficiency. For example, as a transmitting antenna, the antenna gain can describe how well the antenna converts input power into electromagnetic waves headed in a specified direction. As a receiving antenna, the antenna gain can describe how well the antenna converts electromagnetic waves arriving from a specified direction into electrical power. When no direction is specified, antenna gain can refer to the peak value of the antenna gain. A plot of the antenna gain as a function of direction is called a radiation pattern.

FIG. 1 is a schematic illustration of a wireless access point device according to an embodiment. A wireless access point device 100 can be, for example, an orthogonal frequency-division multiplexing (OFDM) transceiver device. The wireless access point device 100 can communicate with one or more wireless communication devices (not shown in FIG. 1) and can provide communication between the wireless communication devices and a network, such as a local area network (LAN), a wide area network WAN), and/or a network such as, for example, the Internet, as described in more detail below.

As shown in FIG. 1, the wireless access point device 100 (also referred to herein as "access point" or "access point device") can include a processor 128, a memory 126, a communications interface 124 and a radio frequency (RF) transceiver 130. The access point 100 can include a combination of hardware modules and/or software modules (e.g., stored in memory and/or executing in a processor). Each component of access point 100 is operatively coupled to each of the remaining components of access point 100. Furthermore, each operation of RF transceiver 130 (e.g., transmit/receive data), communications interface 124 (e.g., transmit/receive data), as well as each manipulation on memory 126 (e.g., update an up-link policy table), are controlled by processor 128.

Processor 128 can be operatively coupled to memory 126 and communications interface 124. Communications interface 124 can provide for or establish one or more wired and/or wireless data connections, such as connections conforming to one or more known information exchange standards, such as wired Ethernet, wireless 802.11x ("Wi-Fi"), high-speed packet access ("HSPA"), worldwide interoperability for microwave access ("WiMAX"), wireless local area network ("WLAN"), Ultra-wideband ("UWB"), Universal Serial Bus ("USB"), Bluetooth®, infrared, Code Division Multiple Access ("CDMA"), Time Division Multiple Access ("TDMA"), Global Systems for Mobile Communications ("GSM"), Long Term Evolution ("LTE"), broadband, fiber optics, telephony, and/or the like.

Memory 126 can be, for example, a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and an SSD.

The processor 128 can be any of a variety of processors. Such processors can be implemented, for example, as hardware modules such as embedded microprocessors, Application-Specific Integrated Circuits ("ASICs"), and Programmable Logic Devices ("PLDs"). Some such processors can have multiple instruction-executing units or cores. Such processors can also be implemented as one or more software modules (e.g., stored in memory and/or executing in a processor) in programming languages such as, for example, Java™, C++, C, assembly, a hardware description language, or any other suitable programming language. A processor according to some embodiments includes media and computer code (also can be referred to as code) specially designed and constructed for the specific purpose or purposes. In some embodiments, the processor 128 can support standard HTML, and software languages such as, for example, JavaScript, JavaScript Object Notation (JSON), Asynchronous JavaScript (AJAX).

In some embodiments, the processor 128 can be, for example, a single physical processor such as a general-purpose processor, an ASIC, a PLD, or a FPGA having a single processing core or a group of processing cores. Alternatively, the processor 128 can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In yet other alternatives, the processor 128 can be a group of distributed processors (e.g., computing devices with one or more physical processors) operatively coupled one to another via a separate communications network (not shown). Thus, the processor 128 can be a group of distributed processors in communication one with another via a separate communications network (not shown). In some embodiments, a processor can be a combination of such processors. For example, a processor can be a group of distributed computing devices, where each computing device includes a group of physical processors sharing a memory bus and each physical processor includes a group of processing cores.

The access point 100 also includes one or more vertically-polarized internal antenna 140 and one or more horizontally-polarized antennas 150 (collectively also referred to as "the internal antennas"). The vertically-polarized antenna(s) 140 can be for example, an omnidirectional, vertically-polarized antenna that operates in the 2.4 GHz band or operates in the 5.0 GHz band. The horizontally-polarized antenna(s) 150 can be, for example, an omnidirectional, horizontally-polarized antenna that operates in the same band as the vertically-polarized internal antenna 140 (e.g., the 2.4 GHz band or the 5.0 GHz band). For example, in some embodiments, the access point 100 can include a vertically-polarized internal antenna 140 and two horizontally-polarized antennas 150 each operating in the 2.4 GHz band or the 5.0 GHz band. In other embodiments, the access point 100 can include a horizontally-polarized internal antenna 150 and two vertically polarized antennas 140 each operating in the 2.4 GHz band or the 5.0 GHz band.

In some embodiments, the access point 100 can include one or more horizontally-polarized antenna 150 and one or more vertically-polarized antennas 140 that operate in the 2.4 GHz band, and one or more horizontally-polarized antenna 150 and one or more vertically-polarized antennas 140 that operate in the 5.0 GHz band. For example, in some embodiments, the access point 100 can include a first vertically-polarized internal antenna 140 and two horizontally-polarized antennas 150 each operating in the 5.0 GHz band, and a second vertically-polarized internal antenna (not shown in FIG. 1) and two horizontally-polarized internal antennas (not shown in FIG. 1) each operating in the 2.4 GHz band. In some embodiments, the access point 100 can include a first horizontally-polarized internal antenna 150 and two vertically-polarized antennas 140 each operating in the 5.0 GHz band, and a second horizontally-polarized internal antenna 150 and two vertically-polarized internal antenna 140 each operating in the 2.4 GHz band.

Thus, in some embodiments, the access point 100 can be dual-radio multiple input-multiple output (MIMO) access point that is enabled to operate concurrently in both the 2.4 GHz band (e.g., 802.11b/g/n) and the 5.0 GHz band (e.g., 802.11a/n). In other embodiments, the access point 100 can be, for example, a dual radio high-performance indoor access point that supports 802.11a/b/g/n/ac on both radios. In yet other embodiments, the access point 100 can be equipped with external antenna ports for use with extra indoor or outdoor antennas. In yet another embodiment, the access point 100 can be, for example, a single radio high-performance indoor access point that supports 802.11a/b/g/n/ac.

The internal antennas (e.g., 140, 150) can be in a ceiling mounted orientation within an enclosure (not shown) of the access point 100. In the ceiling mounted orientation, the vertically-polarized internal antenna 140 will have an orientation of polarization that is substantially vertical and the horizontally-polarized internal antennas 150 will have an orientation of polarization that is substantially horizontal when the access point 100 is viewed from a side view. In alternative embodiments, the access point 100 can be configured to be mounted in any other suitable mounting orientation, such as a wall mounted orientation.

As described above, the access point 100 can also include various configurations and/or components to induce band steering at a wireless communication device(s) communicating with the access point 100. For example, various methods and devices can be implemented at the access point 100 and/or wireless communication device(s) to move or steer a wireless communication device(s) from communicating with the access point 100 in, for example, a 2.4 GHz band to communicating with the access point 100 in a 5.0 GHz band. These methods include, for example, a power amplification approach, an approach associated with increasing gains of antennas operating in the 5.0 GHz band within the access point, and/or optimizing the location of antennas operating in the 5.0 GHz band within the access point 100. Each of these approaches can improve the performance of antennas of the access point 100 operating within the 5.0 GHz band relative to the performance of antennas of the access point 100 operating within the 2.4 GHz band, as described in more detail below.

The access point 100 can include processing circuitry 136 that can include various electronic components. In some embodiments, the processing circuitry 136 can be implemented on one or more radio cards (not shown). The processing circuitry 136 can include one or more power amplifiers, such as amplifiers 137 and 138 shown in FIG. 1. For example, the power amplifiers 137 and 138 can each be used to amplify a signal sent to one or more antennas of the access point 100. For example, in some embodiments, an amplifier 137 can be used to amplify a signal sent to a first antenna of the access point 100 that operates within a first band (e.g., 5.0 GHz band), and the amplifier 138 can be used to amplify a signal sent to a second antenna of the access point 100 that operates in a second band (e.g., 2.4 GHz band) that has a lower center frequency than the first band. In such an embodiment, a signal strength associated with the first band at a wireless device communicating with the access point 100 is greater than a signal strength associated with the second band at the wireless device. Thus, the wireless device will be likely to select the first band to communicate with the access point 100 given the higher signal strength at the wireless device.

In some embodiments, the access point 100 can be configured such that the 5.0 GHz band has double or more transmit power relative to the 2.4 GHz band. In some embodiments, power amplification techniques can be applied in the 5.0 GHz radio circuitry, such as the use of a more powerful amplifier, such as, for example, amplifier 137 or 138 shown in FIG. 1, used in the processing circuitry associated with the 5.0 GHz antenna, such that the input power to the 5.0 GHz antenna is at least twice the input power to the 2.4 GHz antenna. Other suitable power amplification techniques can also be applied. In some embodiments, transmit power can be boosted for both omnidirectional antennas and directional antennas within the access point 100.

Such power amplification techniques (e.g., using amplifiers to amplify the 5.0 GHz antennas) can be applied on 5.0 GHz processing circuitry at wireless communication devices, access points, or both. In some embodiments, if a power amplification technique is applied on the 5.0 GHz processing circuitry at one of a wireless communication device or an access point, the unidirectional performance in the 5.0 GHz band provided by the wireless communication device or the access point (having such amplification) can be similar or better than that in the 2.4 GHz band. Furthermore, if such a power amplification technique is applied on the 5.0 GHz processing circuitry at the access point, the wireless communication device communicating with that access point can receive a signal in the 5.0 GHz band with an RSSI (received signal strength indicator) equivalent or higher than that received in the 2.4 GHz band at that wireless communication device. As a result, if the wireless communication device is capable of communicating in both the 5.0 GHz band and the 2.4 GHz band (e.g., capable of 802.11n) with the access point (i.e., a dual band access point), the wireless communication device can undergo band steering to communicate with the access point in the 5.0 GHz band instead of the 2.4 GHz band. Furthermore, data can be downloaded from the access point to the wireless communication device in the 5.0 GHz band. Thus, the download performance to the wireless communication device can be improved over what would otherwise be the case using the more heavily used 2.4 GHz band.

In some embodiments, if the power amplification techniques are applied on 5.0 GHz processing circuitry at both a wireless communication device and an access point, the bidirectional performance in the 5.0 GHz band provided by the pair of the wireless communication device and the access point can be similar or better than that in the 2.4 GHz band. Thus, the wireless communication device can receive a signal in the 5.0 GHz band with an RSSI equivalent or higher than that received in the 2.4 GHz band at that wireless communication device. Furthermore, a negotiated link rate in the 5.0 GHz band that is the same or higher than that in the 2.4 GHz band can be achieved between the wireless communication device and the access point. As a result, performance and control management provided to the wireless communication device can be an incentive for the wireless communication device to comply with band-steering requests from a wireless local area network (WLAN) infrastructure. That is, the wireless communication device can be incentivized to move from the 2.4 GHz band to the 5.0 GHz band. Consequently, similar or better wireless communication device performance, as well as overall network performance can be achieved in the WLAN.

In another approach to support band steering, an antenna gain of a 5.0 GHz antenna(s) in the access point 100 can be optimized to be greater than an antenna gain of a 2.4 GHz antenna(s) in the access point 100. For example, an antenna gain of a 5.0 GHz antenna(s) in the access point 100 can be optimized to have at least twice an antenna gain (i.e., power gain) of the 2.4 GHz antenna(s) in the access point 100. In such embodiments, the 5.0 GHz antenna can have an antenna gain, for example, that is approximately 3 dB higher than that of the 2.4 GHz antenna in the access point 100. In some embodiments, the ratio of the antenna gain of a 5.0 GHz antenna(s) to the antenna gain of a 2.4 GHz antenna(s) within the access point 100 can be, for example, greater than 1. Such a ratio can be, for example, a ratio greater than 1 but less than 2. In some embodiments, the antenna gain of the 5.0 GHz antenna(s) can be more than the antenna gain of the 2.4 GHz antenna(s) but less than twice of the antenna gain of the 2.4 GHz antenna(s).

In some embodiments, 5.0 GHz antennas can be about half the physical size of 2.4 GHz antennas at similar antenna gains. Thus, 5.0 GHz antennas that have a similar size as 2.4 GHz antennas can achieve an antenna gain approximately twice of that for the 2.4 GHz antennas. That is, 5.0 GHz antennas can have an antenna gain approximately twice of that of 2.4 GHz antennas, where the 5.0 GHz antennas are in the same form factor as the corresponding size of the 2.4 GHz antennas.

The higher gain antenna approach to band steering can be applied in an access point device(s), wireless communication device(s), or both. For example, an access point and/or a wireless communication device can have 5.0 GHz antennas that have an antenna gain that is twice or more than an antenna gain of the 2.4 GHz antennas included in the access point and/or the wireless communication device. In one example, if the antenna gain of the 5.0 GHz antennas in one of the access point or the wireless communication device is twice or more than the antenna gain of the 2.4 GHz antennas in that access point or that wireless communication device, the bidirectional performance (e.g., link performance) in the 5.0 GHz band for the pair of the access point and the wireless communication device can be twice or more of the bidirectional performance in the 2.4 GHz band for that pair of wireless communication device and access point. If the antenna gain of the 5.0 GHz antennas in both the access point and the wireless communication device is twice or more of that of the gain of the 2.4 GHz antennas on that access point and that wireless communication device, the bidirectional performance in the 5.0 GHz band for the pair of the access point and the wireless communication device can be four times or more of the bidirectional performance in the 2.4 GHz band for that pair of wireless communication device and access point.

In yet another approach for supporting band steering at the access point 100, in some embodiments, the position of the antennas (e.g.. the 2.4 GHz antennas and the 5.0 GHz antennas) within the access point 100 can be optimized to improve link performance between the access point 100 and a wireless communication device(s) associated with the 5.0 GHz band relative to the link performance associated with the 2.4 GHz band. For example, a 5.0 GHz antenna in the access point 100 can be placed at a particular location within the access point 100 with an appropriately-tuned height, such that the performance of the 5.0 GHz antenna in signal transmission can be optimized or improved. Such a location can be referred to as a "prime" location associated with the access point 100. The prime location can be, for example, a center-point or center region of the access point 100. In addition to, or alternatively, a 2.4 GHz antenna in the access point 100 can be placed at a location within the access point such that only sub-optimal performance is achieved for the 2.4 GHz antenna. For example, the 2.4 GHz antenna can be placed near an edge of the access point 100. In this example, the performance of the 2.4 GHz antenna is sacrificed to improve the performance of the 5.0 GHz antenna.

In some embodiments, the access point 100 can in addition to, or alternatively to, the approaches described above, include a radio card (not shown) used for the 5.0 GHz antenna that is different than a radio card (not shown) used for the 2.4 GHz band. Specifically, a more powerful, specifically-configured radio card can be used for the 5 GHz band relative to the radio card used for the 2.4 GHz band. As a result, the performance of the 5.0 GHz band can be improved relative to the performance of the 2.4 GHz band.

In some embodiments, various combinations of the power amplification approach, the antenna gain approach, and/or the antenna location optimization approach can be implemented for an access point(s) and/or a wireless communication device(s). Specifically, each of the different approaches can be separately implemented on an access point, a wireless communication device, or both, or implemented in combination to increase or improve the link performance (e.g., in terms of RSSI) for the 5.0 GHz band relative to the link performance for the 2.4 GHz band for the same pair of access point and wireless communication device. In some embodiments, for example, the RSSI associated with the 5.0 GHz band can be increased from being substantially the same RSSI as the RSSI associated with the 2.4 GHz band to up to eight times the RSSI associated with the 2.4 GHz band, for the same pair of access point and wireless communication device. Such a neutral to large performance improvement obtained in the 5.0 GHz band versus the 2.4 GHz band can incentivize wireless communication devices, or at least not penalize wireless communication devices, to move from the 2.4 GHz band to the 5 GHz band. Consequently, an overall network performance increase can be achieved across the WLAN.

As described above, in some embodiments, the access point 100 can provide band steering such that the 5.0 GHz antennas (e.g., antennas operating in 802.11a/n) in the access point 100 have a higher transmit power, and/or power gain, than the 2.4 GHz antennas (e.g., antennas operating in 802.11b) in access point 100. For example, the 5.0 GHz antennas in the access point 100 can have a maximum transmit power of 23 dBm, and the 2.4 GHz antennas in access point 100 can have a maximum transmit power of 18 dBm. In another example, the 5 GHz antennas in the access point 100 can have a maximum transmit power of 19 dBm, and the 2.4 GHz antennas in the access point 100 can have a maximum transmit power of 17 dBm. In yet another example, the 5 GHz antennas in the access point 100 can have a power gain of 13.5 dB, and the 2.4 GHz antennas in the access point 100 can have a power gain of 10.9 dB.

Figure 2:
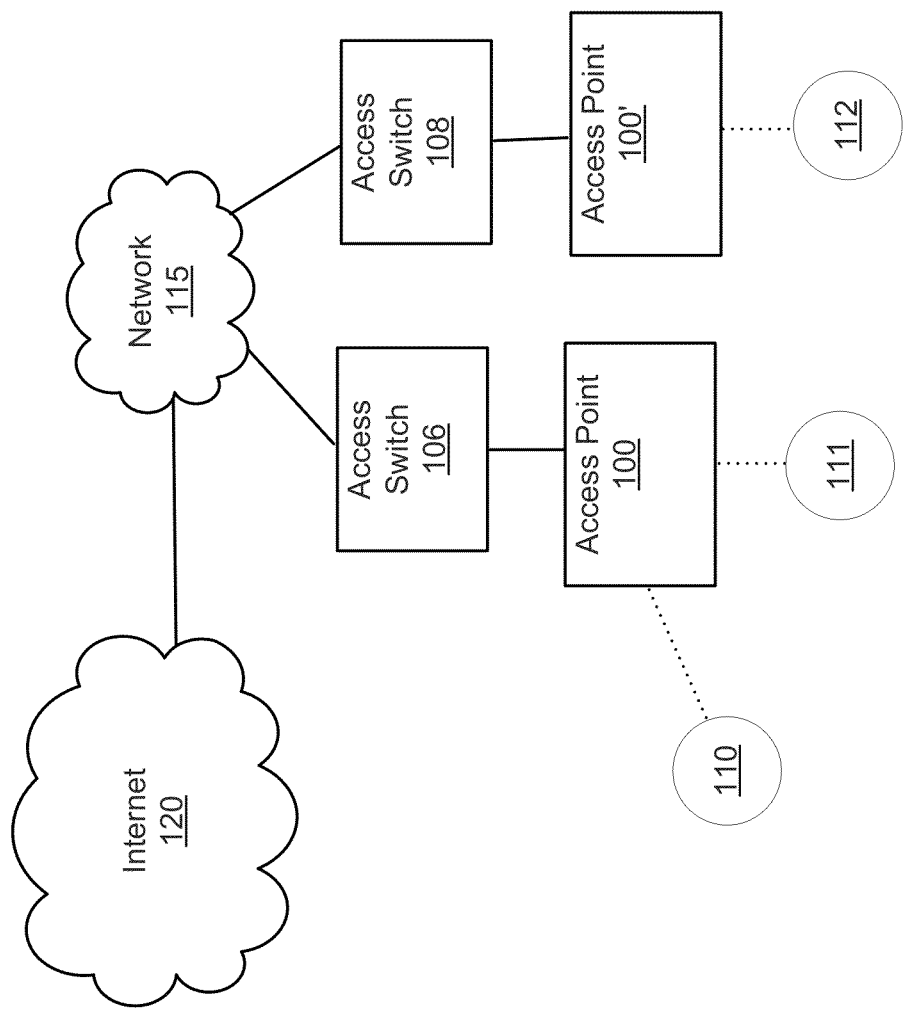
FIG. 2 is a schematic illustration of the wires access point device of FIG. 1 within a network environment.

As shown in FIG. 2, the access point 100 can communicate with one or more wireless communications devices, such as the wireless communication devices 110 and 111. For example, the wireless communication devices 110 and 111 can send signals to and receive signals from the access point 100. The access point 100 can provide communication between the wireless communications devices 110, 111 and a network 115 and/or a network such as, for example, the Internet 120. Network 115 can be, for example, a local area network (LAN) or a wide area network (WAN). The wireless communications devices 110 and 111 can be, for example, a tablet device, a netbook computer, a Wi-Fi enabled laptop, a mobile phone, a laptop computer, a personal digital assistant (PDA), a portable/mobile internet device and/or some other electronic communications device configured to wirelessly communicate with other devices.

In some embodiments, access point 100 can communicate with one or more wireless communication devices, such as wireless communication devices 110 and 111 using any suitable wireless communication standard such as, for example, Wi-Fi, Bluetooth, and/or the like. Specifically, access point 100 can be configured to receive data and/or send data through RF transceiver 130 (FIG. 1), when communicating with a wireless communication device. Furthermore, in some embodiments, an access point 100 of a network 115 can use one wireless communication standard to wirelessly communicate with a wireless communication device operatively coupled to the access point 100; while another access point 100' (shown in FIG. 2) of the network 115 can use a different wireless communication standard to wirelessly communicate with a wireless communication device 112 operatively coupled to access point 100'. For example, as shown in FIG. 2, access point 100 can receive data packets through its RF transceiver 130 from wireless communication device 110 or 111 (e.g., a Wi-Fi enabled laptop) based on the Wi-Fi standard; while access point 100' can send data packets from its RF transceiver (not shown) to the wireless communication device 112 (e.g., a Bluetooth-enabled mobile phone) based on the Bluetooth standard. Although two access points 100, 100' and two access switches 106, 108, are shown in FIG. 2, it should be understood that any number of access points and access switches can be included.

In some embodiments, access point 100 can be operatively coupled to an access switch, such as an access switch 106 or an access switch 108 shown in FIG. 2, by implementing a wired connection between communications interface 124 (FIG. 1) and the counterpart (e.g., a communications interface) of the access switch 106 or 108. The wired connection can be, for example, twisted-pair electrical signaling via electrical cables, fiber-optic signaling via fiber-optic cables, and/or the like. As such, access point 100 can be configured to receive data and/or send data through communications interface 124, which is connected with the communications interface 124 of the access switch 106, when access point 100 is communicating with the access switch 106. Furthermore, in some embodiments, the access point 100' can implement a wired connection with an access switch (e.g., access switch 106) operatively coupled to the access point 100; while the access point 100' implements a different wired connection with another access switch (e.g., access switch 108) operatively coupled to the access point 100'. As shown in FIG. 2, access point 100 can implement one wired connection such as twisted-pair electrical signaling to connect with access switch 106; while access point 100' can implement a different wired connection such as fiber-optic signaling to connect with access switch 108.

Although not explicitly shown in FIG. 2, it should be understood that an access point 100 can be connected to one or more other access points, which in turn, can be coupled to yet one or more other access points. In such an embodiment, the collection of interconnected access points can define a wireless mesh network. In such an embodiment, the communications interface 124 of access point 100 can be used to implement a wireless connection(s) to the counterpart (e.g., a communications interface) of another access point(s). As such, access point 100 can be configured to receive data and/or send data through communications interface 124, which is connected with the communications interface of another access point, when access point 100 is communicating with that access point.

The access point 100 can provide, for example, wireless communication device access, spectrum analysis, mesh, and bridging services to various wireless communication devices, such as communication devices 110, 111. In some embodiments, the access point 100 can support 802.11a/b/g as well as 802.11n. Furthermore, in some embodiments, the access point 100 can operate in the 2.4 GHz band and the 5.0 GHz band simultaneously. In such embodiments, the access points 100 can provide, for example, seamless mobility both indoors and outdoors, and enable scalable deployment of wireless voice over IP (VoIP), video, and real-time location services.

In some embodiments, the access point 100 can provide band steering, wireless communication device load balancing, dynamic authorization, quality of service (QoS), bandwidth controls, dynamic call admission control (CAC), and/or other services, all of which combine to provide a more consistent user experience as traffic is more evenly distributed across access points and/or frequency bands (e.g., the 2.4 GHz band and the 5.0 GHz band). This also can improve scalability, providing the same consistent user experience for thousands of mobile users and devices.

In some embodiments, when the access points 100 is operative, the access point 100 can automatically monitor the data integrity and RF signal strength of wireless channels, and continually tune for optimal RF channel and transmit power. Continuous scanning of the RF spectrum also allows early detection, classification, avoidance and remediation of performance degrading interference sources.

In some embodiments, the access point 100 can be, for example, a high-performance outdoor access point that support 802.11a/b/g/n. In some embodiments, the access point 100 can be placed in ruggedized, weatherproof enclosure that is suitable for extreme outdoor environments. Furthermore, in some embodiments, the access point 100 can support high-performance wireless communication device access, long distance bridging, and mesh services.

Figure 3:
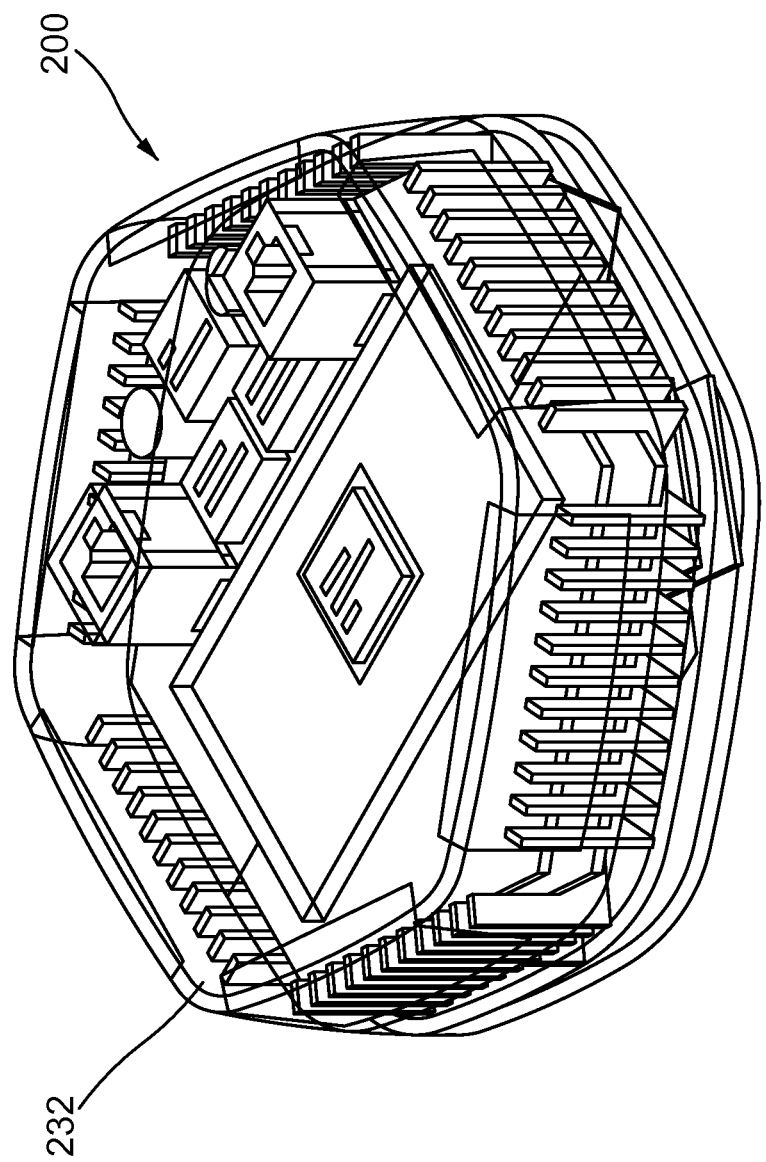
FIG. 3 is a top perspective view of a wireless access point device, according to an embodiment.
Figure 4:
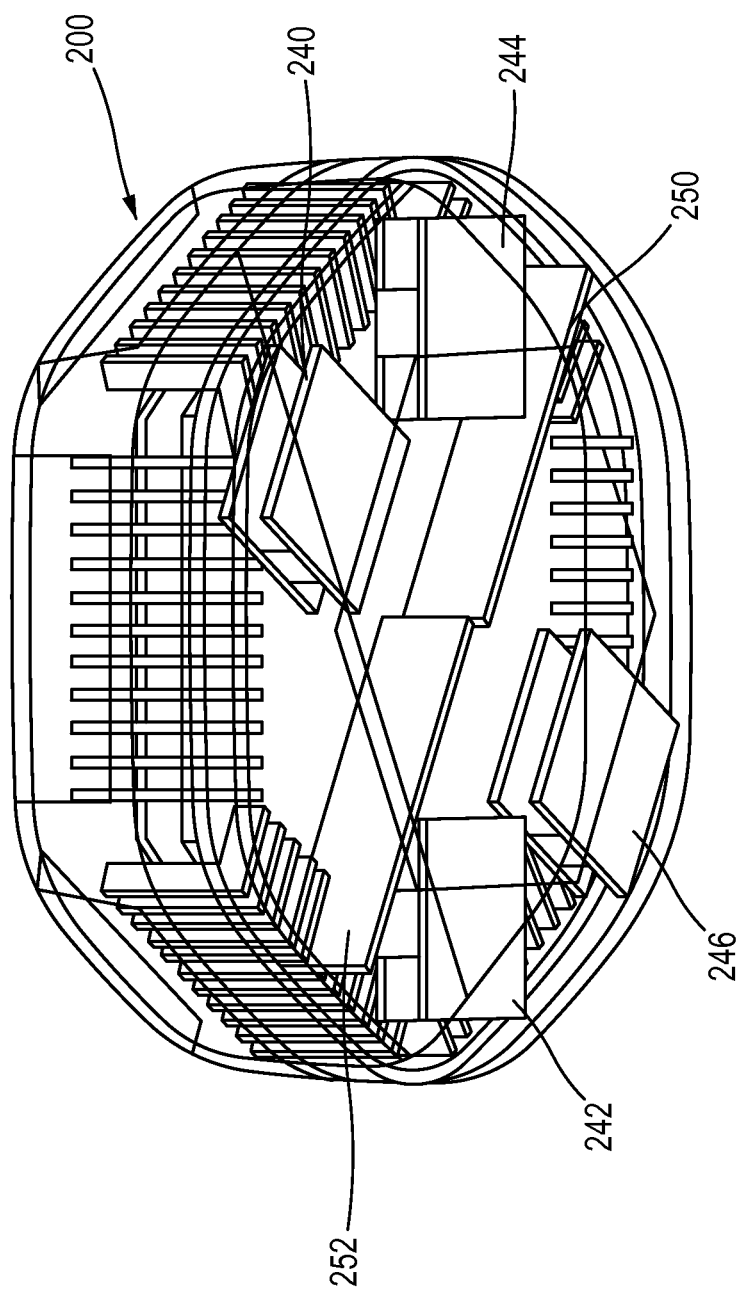
FIG. 4 is a bottom perspective view of the wireless access point device of FIG. 3.
Figure 5:
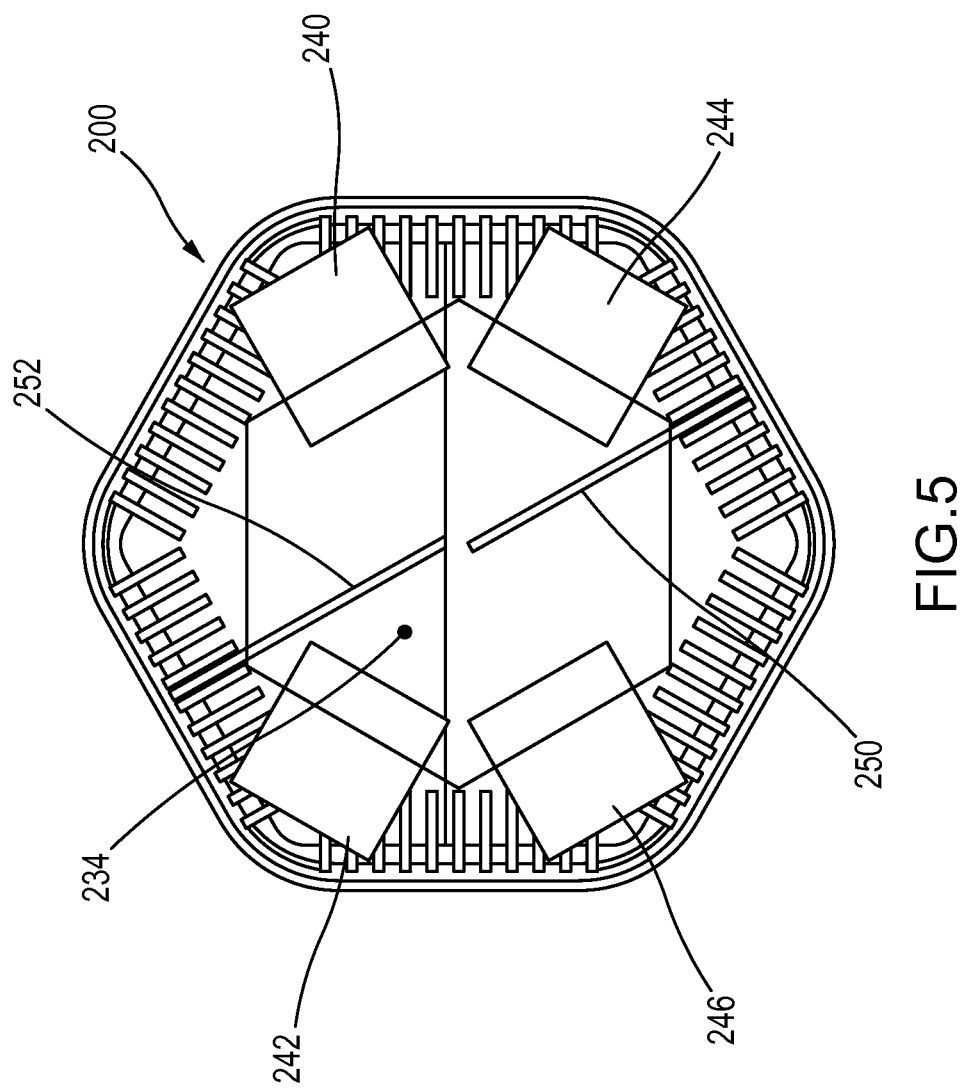
FIG. 5 is a bottom view of the wireless access point device of FIG. 3.

FIGS. 3-5 illustrate an access point, according to another embodiment. An access point 200 can be configured the same as or similar to, and function the same as or similar to the access point 100 described above. FIG. 3 is a top perspective view of the access point 200; FIG. 4 is a bottom perspective view of the access point 200 and FIG. 5 is a bottom view of the access point 200. The access point 200 can be, for example, a multiple input-multiple output (MIMO) access point that is enabled to operate concurrently in both the 2.4 GHz band (e.g., 802.11b/g/n) and the 5.0 GHz band (e.g., 802.11a/n).

The access point 200 includes an enclosure 232 that can be mounted to a ceiling, wall, wallplate, pole, or other surface or object. In this embodiment, the access point 200 includes six internal antennas mounted within the enclosure 232 adjacent to a heat sink plate 234. Specifically, the access point 200 includes three internal antennas configured to operate in the 2.4 GHz antennas, and three internal antennas configured to operate in the 5.0 GHz band. The access point 200 includes a first omnidirectional horizontally-polarized internal antenna 250, a first omnidirectional vertically-polarized internal antenna 240 and a second omnidirectional vertically-polarized internal antenna 242 that each operate in the 2.4 GHz band. The access point 200 also includes a second omnidirectional horizontally-polarized internal antenna 252, a third omnidirectional vertically-polarized internal antenna 244 and a fourth omnidirectional vertically-polarized internal antenna 246 that each operate in the 5.0 GHz band. In some embodiments, each of the vertically-polarized antennas 240, 242, 244, 246 can be disposed at a 5 degree down-tilt relative to the mounting surface to which the access point 200 is mounted.

Figure 6:
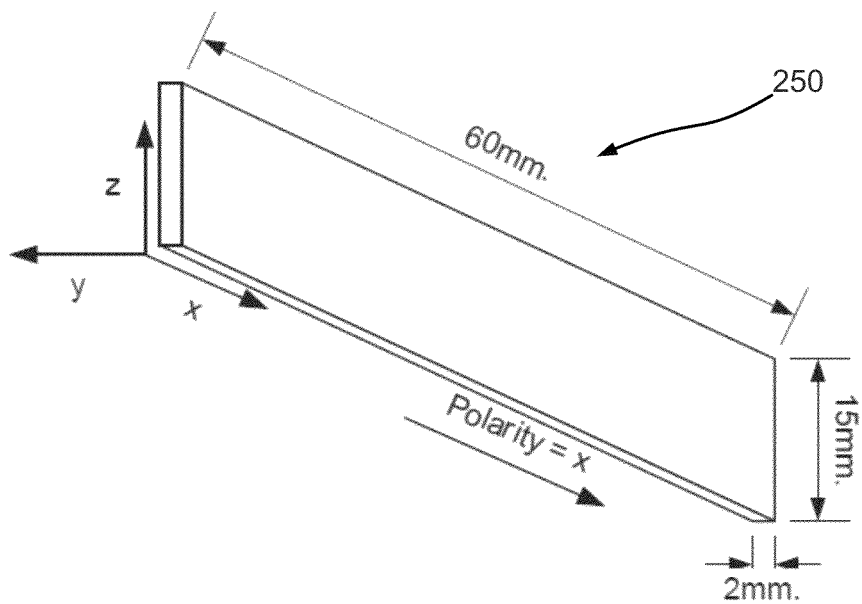
FIGS. 6 and 7 are each a schematic illustration of a different internal antenna of the wireless access point device of FIG. 5.
Figure 7:
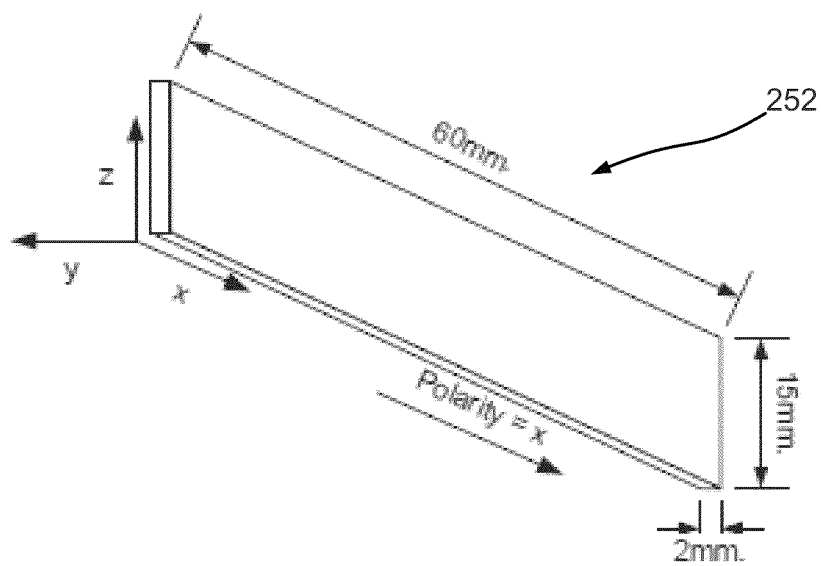
Figure 8:
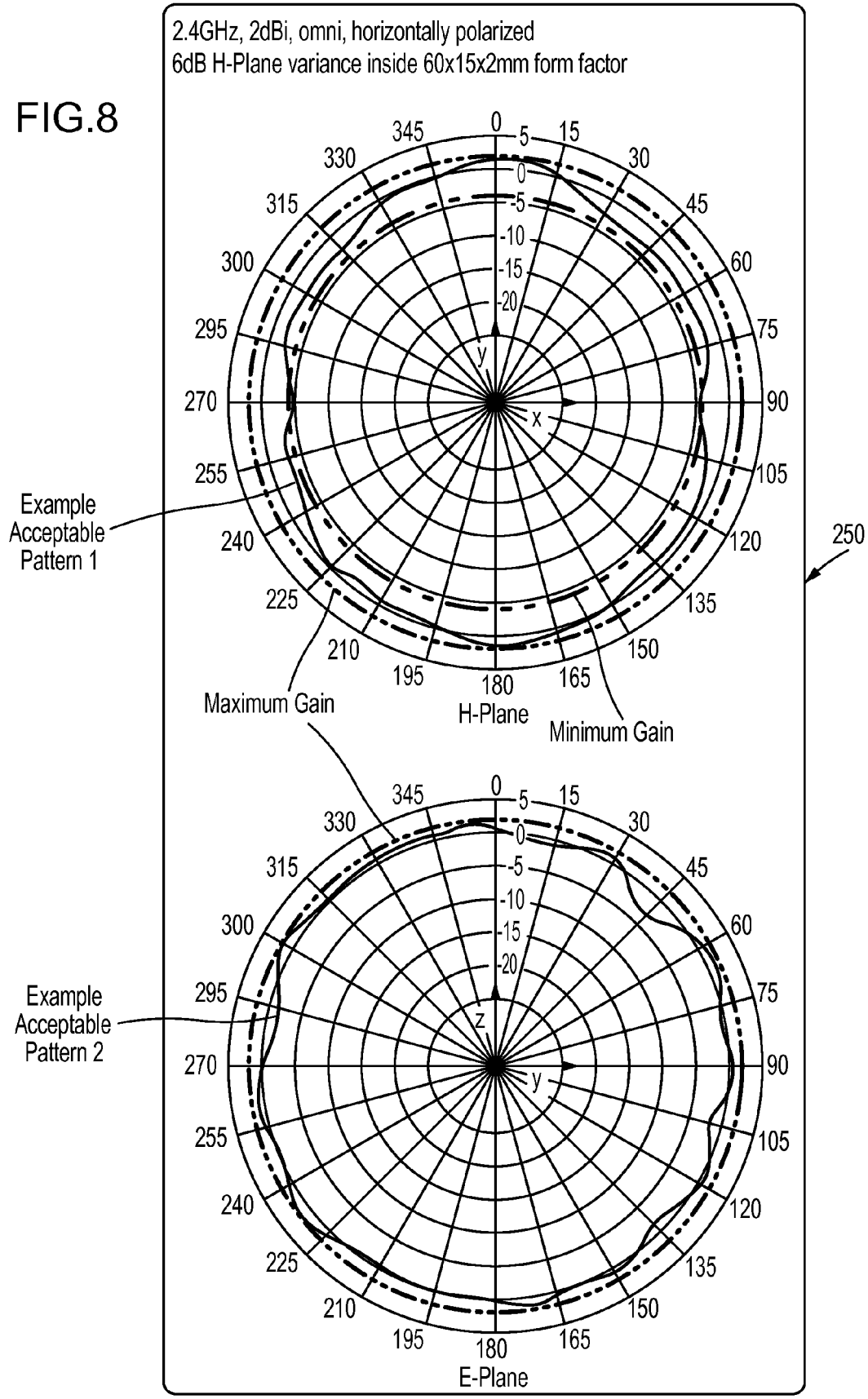
FIGS. 8 and 9 illustrate examples of radiation patterns for the internal antennas of FIGS. 6 and 7, respectively.
Figure 9:
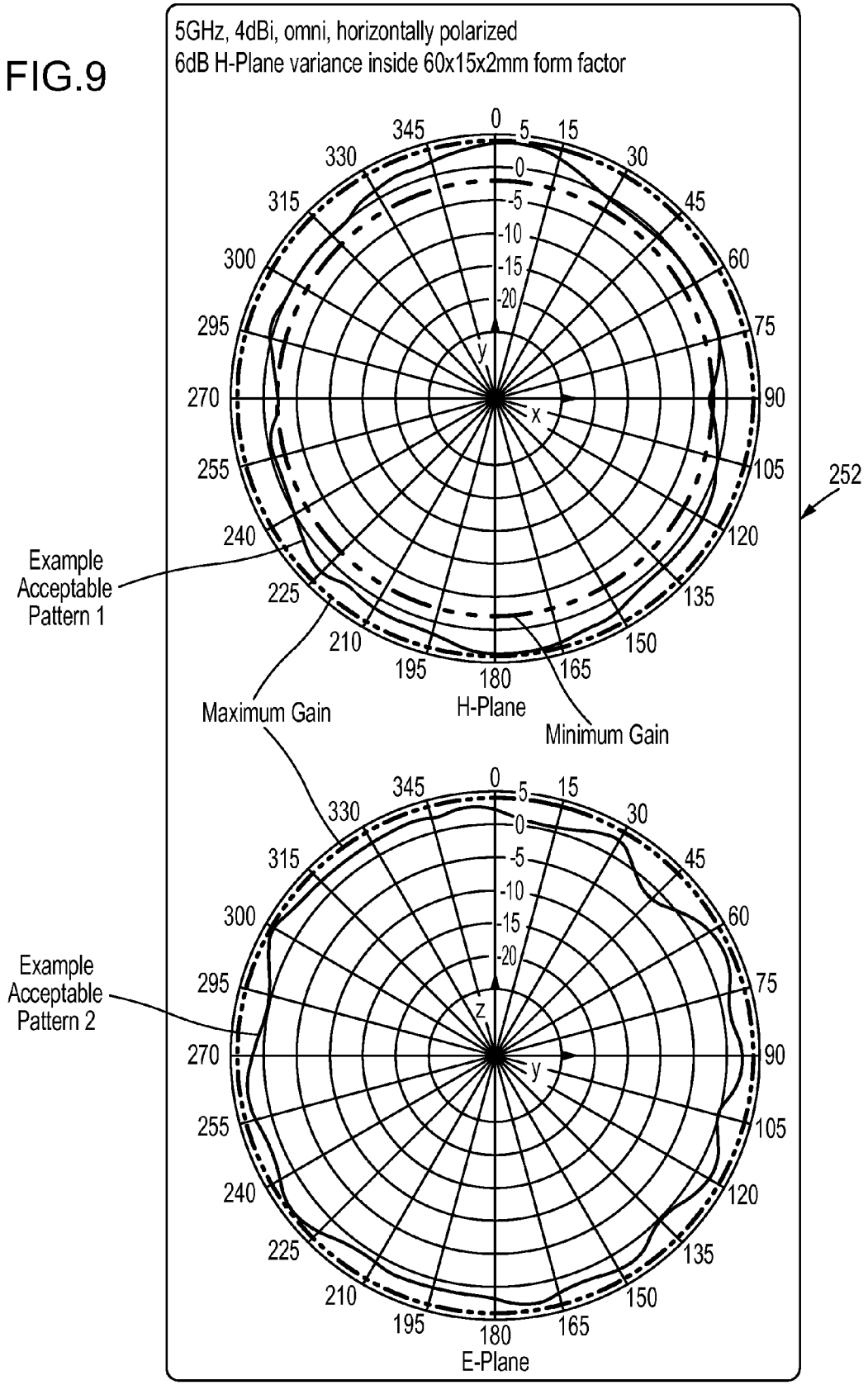

FIGS. 6 and 7 are schematic illustrations of the first horizontally-polarized internal antenna 250 and the second horizontally-polarized internal antenna 252, respectively, and illustrate form-factor characteristics (e.g., dimensions) of the first horizontally-polarized internal antenna 250 and the second horizontally-polarized internal antenna 252. FIGS. 8 and 9 illustrate radiation patterns of the first horizontally-polarized internal antenna 250 and the second horizontally-polarized internal antenna 252, respectively. As shown in FIGS. 6 and 7, the first horizontally-polarized internal antenna 250 and the second horizontally-polarized internal antenna 252 are structurally and dimensionally the same; for example, each has a form-factor of 60 mm×15 mm×2 mm and has an orientation of polarization that is substantially horizontal when disposed within enclosure 232 (e.g., along an x-axis shown in FIGS. 6 and 7).

In some embodiments, the first horizontally-polarized internal antenna 250 can have a gain, for example, of 2 dBi, and the second horizontally-polarized internal antenna 252 can have a gain, for example, of 4 dBi. FIGS. 8 and 9 illustrate example specifications and details of acceptable radiation patterns, H-Plane gain and E-Plane gain for the first horizontally-polarized internal antenna 250 and the second horizontally-polarized internal antenna 252. As shown in FIG. 8, the outer dot-dash (-..-) line in the H-Plane diagram illustrates a maximum gain and the inner dot-dash (-..-) line in the H-Plane diagram illustrates a minimum gain for the first horizontally-polarized internal antenna 250. As shown in FIG. 8, the solid line in the H-Plane diagram is an example acceptable radiation pattern for the first horizontally-polarized internal antenna 250. The dot-dash (-..-) line in the E-Plane diagram of FIG. 8 is a maximum gain and the solid line is an example acceptable radiation pattern for the first horizontally-polarized internal antenna 250.

Similarly, as shown in FIG. 9, the outer dot-dash (-..-) line in the H-Plane diagram illustrates a maximum gain and the inner dot-dash (-..-) line in the H-Plane diagram illustrates a minimum gain for the second horizontally-polarized internal antenna 252. The solid line in the H-Plane diagram is an example acceptable radiation pattern for the second horizontally-polarized internal antenna 252. The dot-dash (-..-) line in the E-Plane diagram of FIG. 9 is a maximum gain and the solid line is an example acceptable radiation pattern for the second horizontally-polarized internal antenna 252.

As shown, for example, in FIG. 8, a 6 dB H-Plane variance corresponds to an acceptable pattern for the first horizontally-polarized internal antenna 250 that can vary from, for example, 2 dBi to −4 dBi around the extent of the horizontal pattern. This variance can provide acceptable MIMO performance of the access point 200, and less or more variance can be undesirable. This variance can be in the form of a bias towards two lobes (not shown), or it can be in the form of a rapid variance across a sequence of small sectors, or anything in-between. In some embodiments, as shown in FIG. 8, the gain for the first horizontally-polarized internal antenna 250 can vary from, for example, 2 dBi to −4 dBi around the 360 degrees horizontal plane.

As shown in FIG. 9, a 6 dB H-Plane variance corresponds to an acceptable pattern for the second horizontally-polarized internal antenna 252 that can vary from, for example, 4 dBi to −2 dBi around the extent of the horizontal pattern. This variance can provide acceptable MIMO performance of the access point, and less or more variance can be undesirable. This variance can be in the form of a bias towards two lobes (not shown), or it can be in the form of a rapid variance across a sequence of small sectors, or anything in between. In some embodiments, as shown in FIG. 9, the gain for the second horizontally-polarized internal antenna 252 can vary from, for example, 4 dBi to −2 dBi around the 360 degrees horizontal plane.

Figure 10:
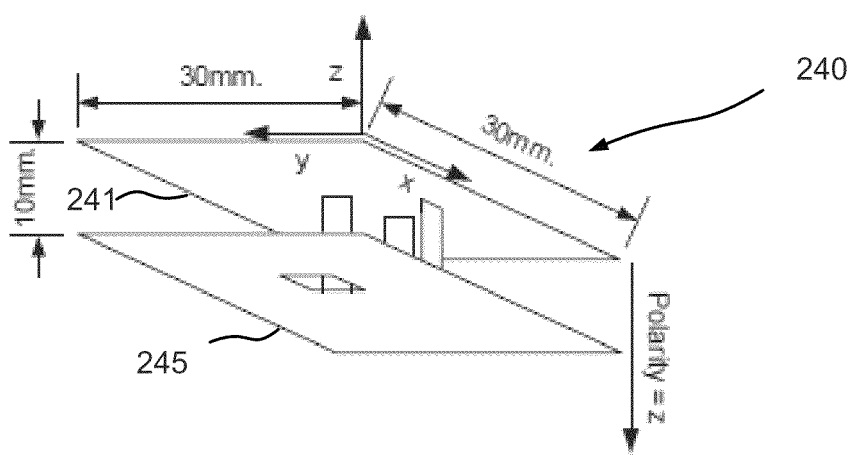
FIGS. 10 and 11 are each a schematic illustration of a different internal antenna of the wireless access point device of FIG. 5.
Figure 11:
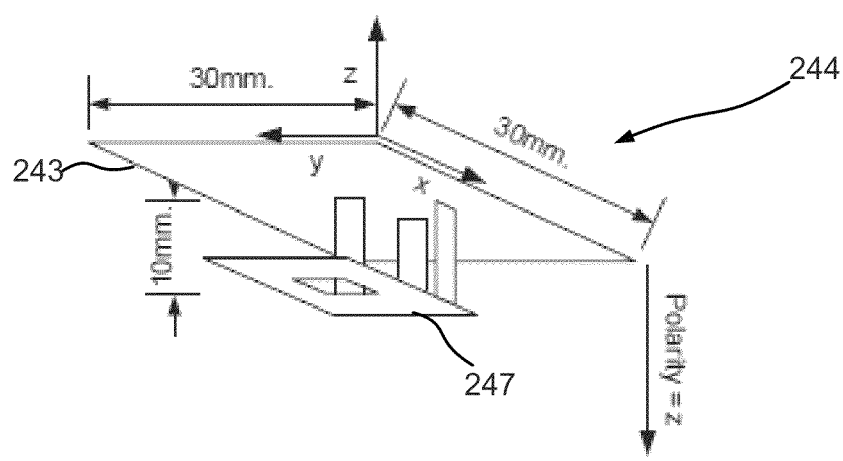

FIGS. 10 and 11 are schematic illustrations of the first vertically-polarized internal antenna 240 and the third vertically-polarized internal antenna 244, respectively. The second vertically-polarized internal antenna 242 can be configured the same as and function the same as the first vertically-polarized internal antenna 240 and the fourth vertically-polarized internal antenna 246 can be configured the same as and function the same as the third vertically polarized internal antenna 244 and are therefore not discussed in detail with reference to FIGS. 10-13. FIGS. 10 and 11 illustrate form-factor characteristics (e.g., dimensions) of the first vertically-polarized internal antenna 240 and the third vertically-polarized internal antenna 244, respectively. As shown in FIGS. 10 and 11, the first vertically-polarized internal antenna 240 and the third vertically-polarized internal antenna 244 each has the same form-factor, for example, a form-factor of 30 mm×30 mm×10 mm and has an orientation of polarization that is substantially vertical (e.g., along a z-axis shown in FIGS. 10 and 11), but can have structural differences as shown in FIGS. 10 and 11. For example, a first portion 241 of the first vertically-polarized internal antenna 240 and a first portion 243 of the third vertically-polarized internal antenna 244 can be dimensionally the same (e.g., have the same length and width), but a second portion 245 of the first vertically-polarized internal antenna 240 and a second portion 247 of the third vertically-polarized internal antenna 244 can be dimensionally different (have a different length and/or width). As shown in FIGS. 10 and 11, in this embodiment, the second portion 245 is larger (e.g., has a greater width and greater length) than the second portion 247.

Figure 12:
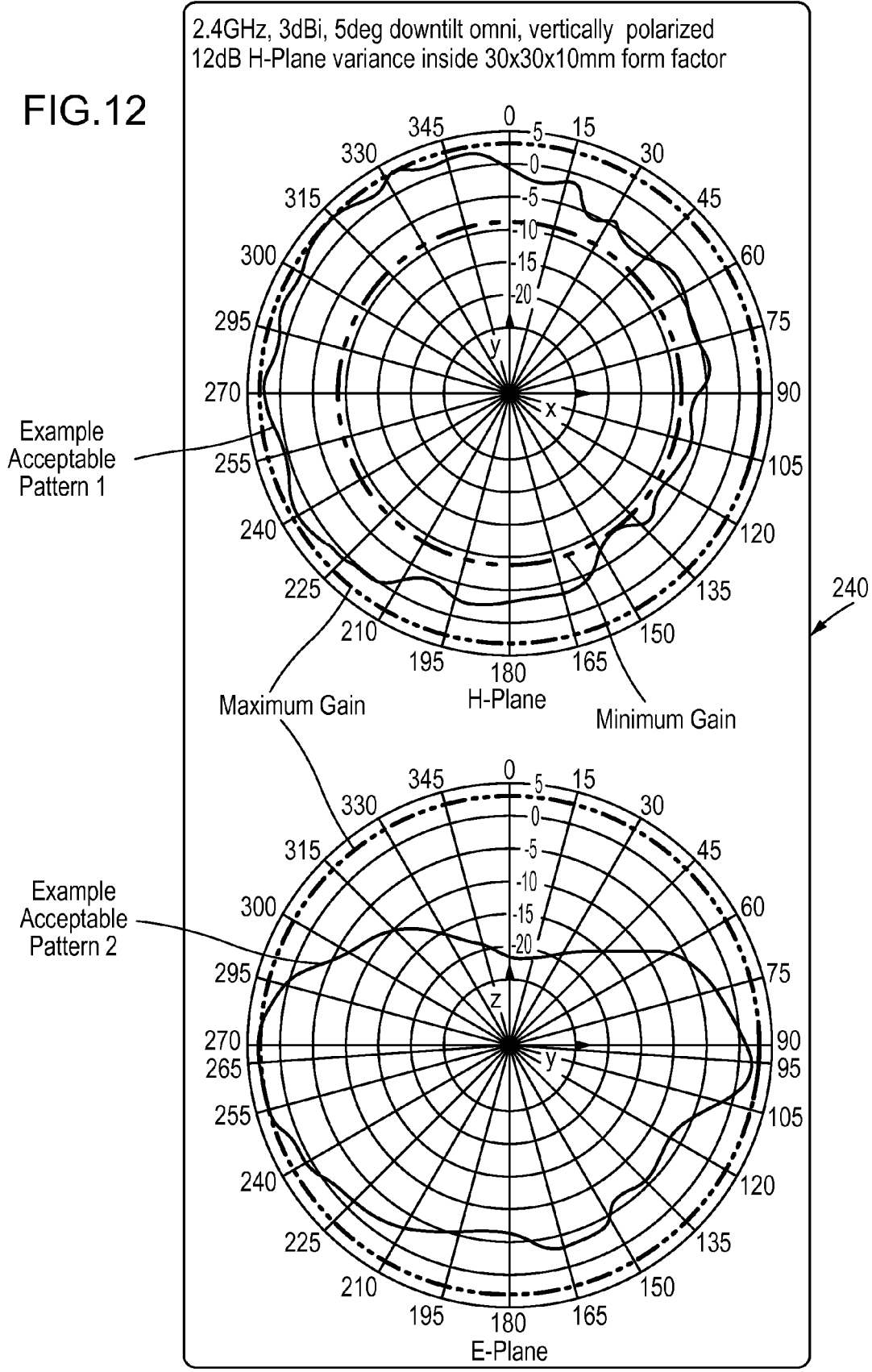
FIGS. 12 and 13 illustrate examples of radiation patterns for the internal antennas of FIGS. 10 and 11, respectively.
Figure 13:
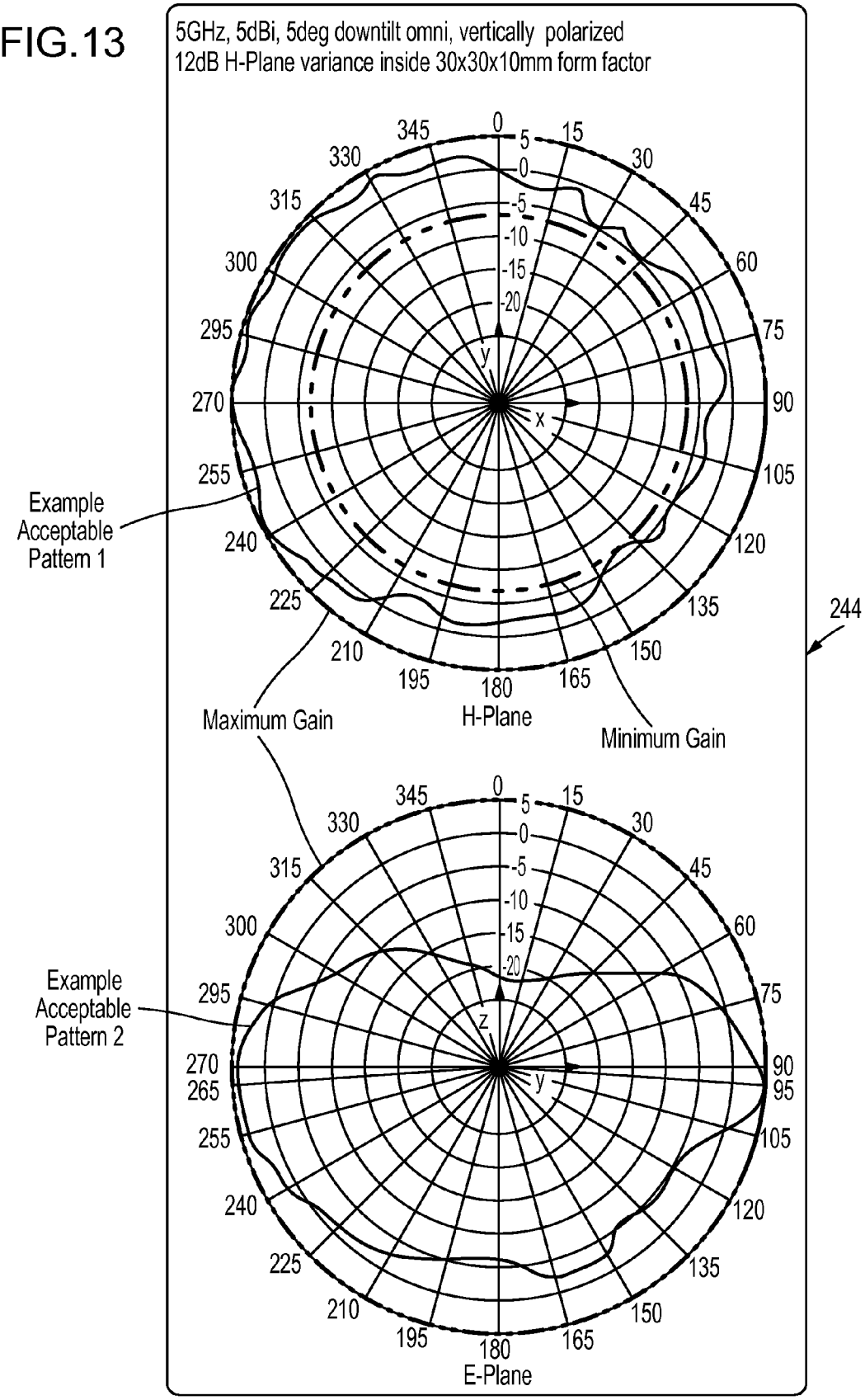

FIGS. 12 and 13 illustrate example specifications and details of acceptable radiation patterns, H-Plane gain and E-Plane gain for the first vertically-polarized internal antenna 240 and the third vertically-polarized internal antenna 244, respectively. As shown in FIG. 12, the outer dot-dash (-..-) line in the H-Plane diagram illustrates a maximum gain and the inner dot-dash (-..-) line in the H-Plane diagram illustrates a minimum gain for the first vertically-polarized internal antenna 240. As shown in FIG. 12, the solid line in the H-Plane diagram is an example acceptable radiation pattern for the first vertically-polarized internal antenna 240. The dot-dash (-..-) line in the E-Plane diagram of FIG. 12 is a maximum gain and the solid line is an example acceptable radiation pattern for the first vertically-polarized internal antenna 240.

Similarly, as shown in FIG. 13, the outer dot-dash (-..-) line in the H-Plane diagram illustrates a maximum gain and the inner dot-dash (-..-) line in the H-Plane diagram illustrates a minimum gain for the third vertically-polarized internal antenna 244. The solid line in the H-Plane diagram is an example acceptable radiation pattern for the third vertically-polarized internal antenna 244. The dot-dash (-..-) line in the E-Plane diagram of FIG. 13 is a maximum gain and the solid line is an example acceptable radiation pattern for the third vertically-polarized internal antenna 244. In some embodiments, the first vertically-polarized internal antenna 240 can have a gain, for example, of 3 dBi, and the third vertically-polarized internal antenna 244 can have a gain, for example, of 5 dBi.

As shown in FIG. 12, a 12 dB H-Plane variance corresponds to an acceptable pattern for the first vertically-polarized internal antenna 240 that can vary from, for example, 3 dBi to −9 dBi around the extent of the horizontal pattern. This variance can provide acceptable MIMO performance of the access point 100, and less or more variance can be undesirable. This variance can be in the form of a bias towards a wide sector as shown in the example acceptable pattern in FIG. 12, or it can be in the form of a rapid variance across a sequence of small sectors, or anything in-between. In some embodiments, as shown in FIG. 12, the gain for the first vertically-polarized internal antenna 240 can vary from, for example, 3 dBi to −9 dBi around the 360 degrees horizontal plane.

As shown in FIG. 13, a 12 dB H-Plane variance corresponds to an acceptable pattern for the third vertically-polarized internal antenna 244 that can vary from, for example, 5 dBi to −7 dBi around the extent of the horizontal pattern. This variance can provide acceptable MIMO performance of the access point 100, and less or more variance can be undesirable. This variance can be in the form of a bias towards a wide sector as shown in the example acceptable pattern in FIG. 13, or it can be in the form of a rapid variance across a sequence of small sectors, or anything in between. In some embodiments, as shown in FIG. 13, the gain for the third vertically-polarized internal antenna 244 can vary from, for example, 5 dBi to −7 dBi around the 360 degrees horizontal plane.

With the example gains described above, the access point 200 can be configured to support band steering. Specifically, the 5 GHz antennas (244, 246, 252) included in the access point 200 can generally have a higher gain than the 2.4 GHz antennas (240, 242, 250). For example, as described above, the first omnidirectional vertically-polarized antenna 240 and the second omnidirectional vertically-polarized antenna 242 operating in the 2.4 GHz band can each have a gain varying from 3 dBi to −9 dBi; and the first omnidirectional horizontally-polarized antenna 250 operating in the 2.4 GHz band can have a gain varying from 2 dBi to −4 dBi. On the other hand, the third omnidirectional vertically-polarized antenna 244 and the fourth omnidirectional vertically-polarized antenna 246 operating in the 5 GHz band can each have a gain varying from 5 dBi to −7 dBi, and the second omnidirectional horizontally-polarized antenna 252 operating in the 5 GHz band has a gain varying from 4 dBi to −2 dBi. Thus, the gain for a 5 GHz antenna in the access point 200 is approximately 2 dB higher than that for a 2.4 GHz antenna with the same polarization (e.g., horizontally or vertically polarized) in the access point 200. As a result, wireless communication devices capable of communicating with the access point 200 in both the 2.4 GHz and 5 GHz bands can be steered or moved from the 2.4 GHz band to the 5 GHz band.

Figure 14:
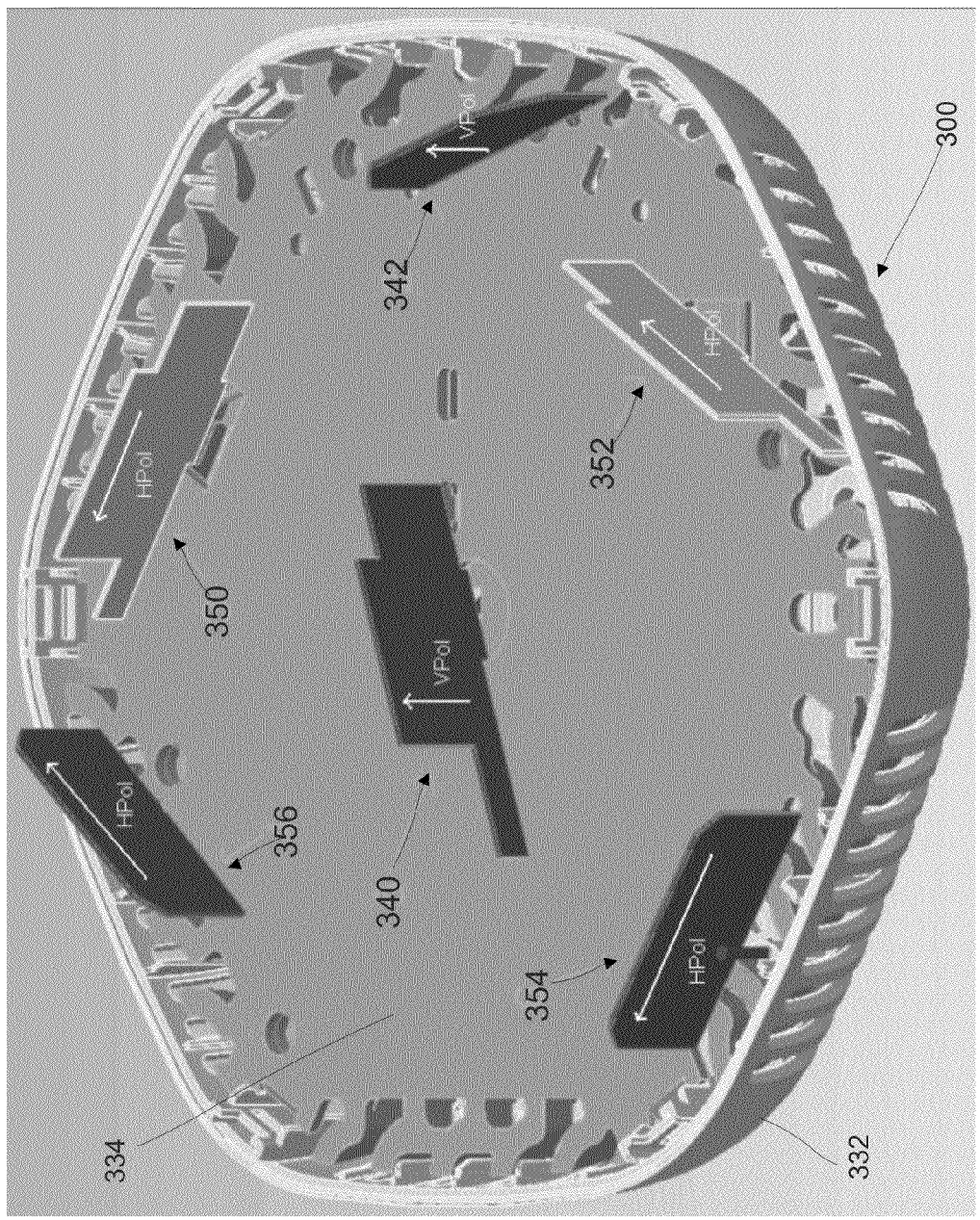
FIG. 14 is a bottom perspective view of a portion of a wireless access point device with a portion of an enclosure removed, according to another embodiment.
Figure 15:
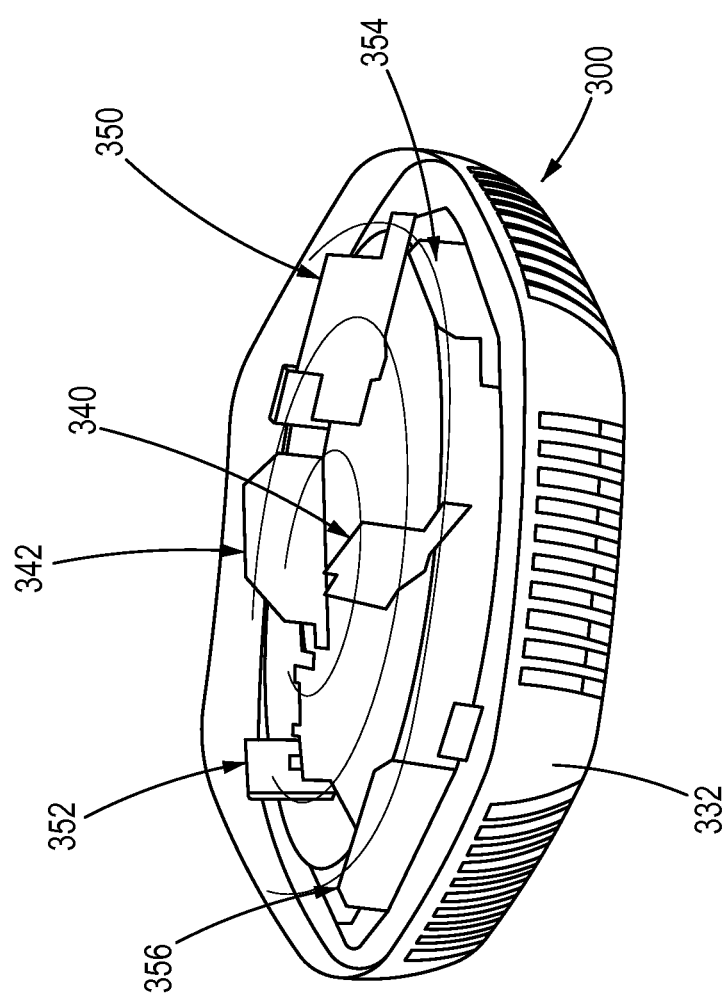
FIG. 15 is a bottom perspective view of the wireless access point device of FIG. 14 with a portion of the enclosure shown transparent.

FIGS. 14 and 15 each illustrate an access point having internal antennas, according to another embodiment. An access point 300 can be configured the same as or similar to, and function the same as or similar to the access points 100 described above. The access point 300 can be, for example, a multiple output (MIMO) access point that is enabled to operate concurrently in both the 2.4 GHz band (e.g., 802.11b/g/n) and the 5.0 GHz band (e.g., 802.11a/n). FIG. 14 is a bottom perspective view of the access point 300 with a portion of an enclosure 332 of the access point 300 removed, and FIG. 15 is a bottom perspective view with the portion of the enclosure shown transparent.

The access point 300 includes the enclosure 332 that can be mounted, for example, to a ceiling or a wall or other support structure. In this embodiment, the access point 300 includes six internal antennas mounted within the enclosure 332 adjacent to a heat sink plate 334. Specifically, the access point 300 includes three internal antennas configured to operate in the 2.4 GHz band, and three internal antennas configured to operate in the 5.0 GHz band. The access point 300 includes a first omnidirectional vertically-polarized internal antenna 340, a first omnidirectional horizontally-polarized internal antenna 350 and a second omnidirectional horizontally-polarized internal antenna 352 that each operates in the 2.4 GHz band. The access point 300 also includes a second omnidirectional vertically-polarized internal antenna 342, a third omnidirectional horizontally-polarized internal antenna 354 and a fourth omnidirectional horizontally-polarized internal antenna 356 that each operates in the 5.0 GHz band.

Figure 17:
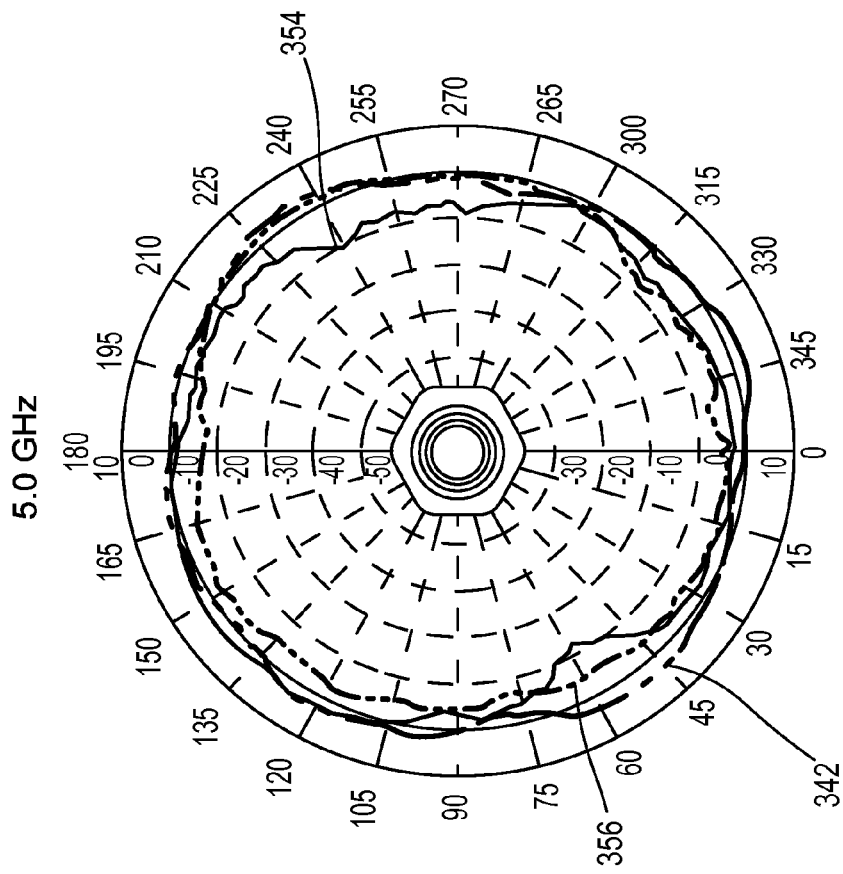
FIG. 17 illustrates an example horizontal-plane radiation pattern for the internal antennas of the wireless access point device of FIG. 14 that operate in the 5.0 GHz band.
Figure 16:
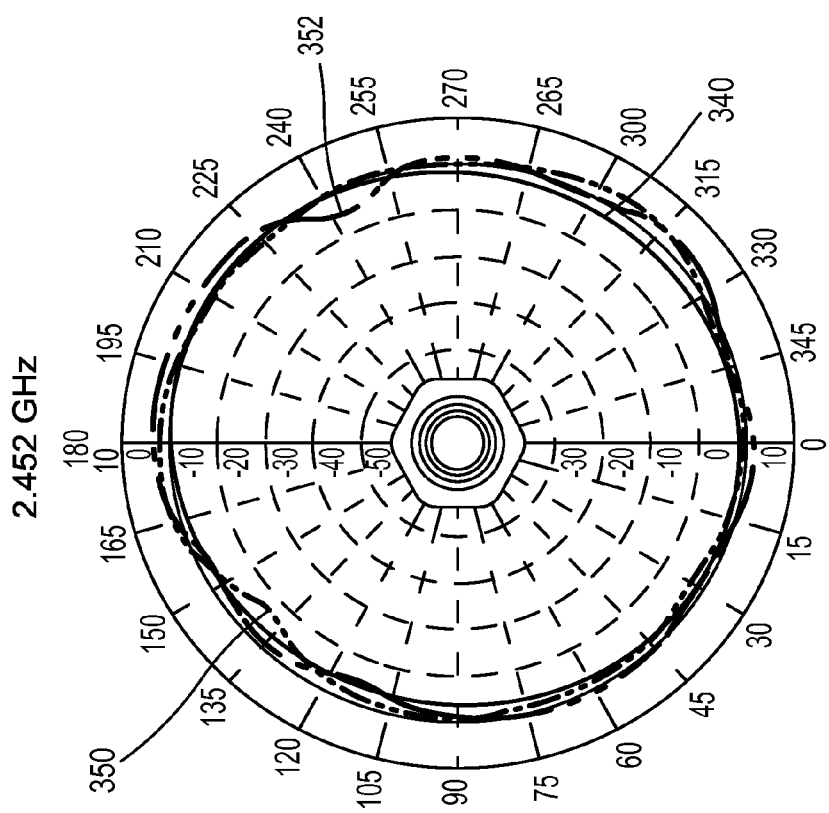
FIG. 16 illustrates an example horizontal-plane radiation pattern for the internal antennas of the wireless access point device of FIG. 14 that operate in the 2.4 GHz band.

FIGS. 16 and 17 each provide graphical depictions of horizontal-plane radiation patterns (omnidirectional) for the internal antennas of the access point 300 operating in the 2.4 GHz band and the 5.0 GHz band, respectively. FIGS. 18 and 19 each provide graphical depictions of vertical-plane radiation patterns (omnidirectional) for the internal antennas of the access point 300 operating in the 2.4 GHz band and the 5.0 GHz band, respectively. FIGS. 16-19 illustrate relative field strengths of signals transmitted from or received by the internal antennas of the access point 300.

Figure 20:
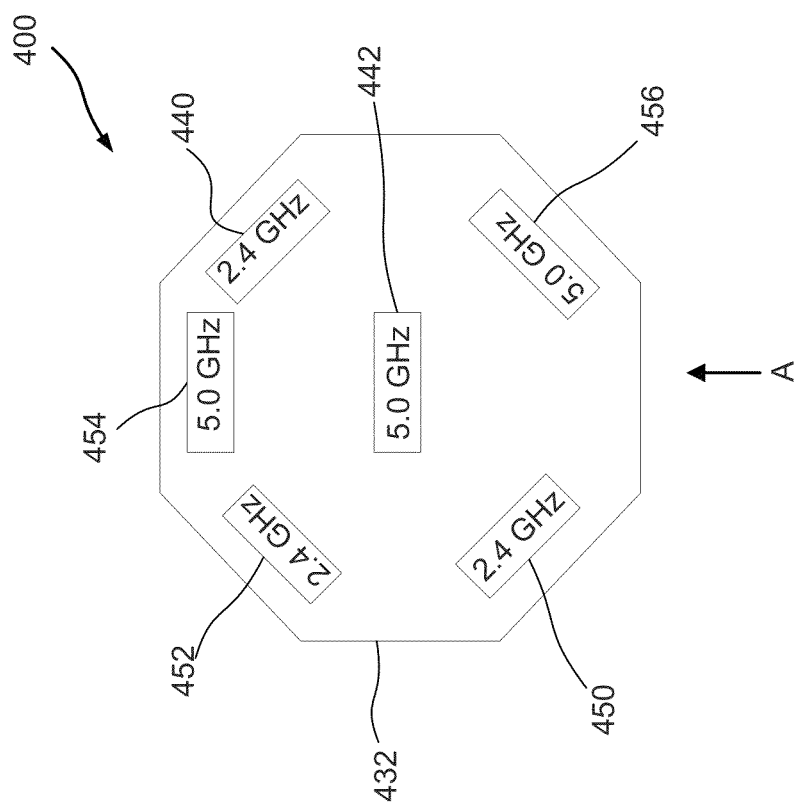
FIG. 20 is a schematic illustration of a wireless access point device, according to another embodiment.

Specifically, FIG. 17 illustrates the horizontal-plane radiation pattern for internal antennas 340, 350 and 352 that operate in the 2.4 GHz band; FIG. 18 illustrates the horizontal-plane radiation pattern for internal antennas 342, 354 and 356 that operate in the 5.0 GHz band. The patterns shown in FIGS. 17 and 18 provide 360-degree even coverage. Similarly, FIG. 19 illustrates the vertical-plane radiation pattern (5 degree downtilt) for the internal antennas 340, 350 and 352 that operate in the 2.4 GHz band; FIG. 20 illustrates the vertical-plane radiation pattern for internal antennas 342, 354 and 356 that operate in the 5.0 GHz band. The patterns shown in FIGS. 19 and 20 provide maximum antenna gains along the outer edges of the access point 300, with a 5-degree downtilt.

As described above for previous embodiments, the access point 300 can be configured to support band steering from the 2.4 GHz band to the 5.0 GHz band. For example, the antennas that operate in the 5 GHz band (i.e., 342, 354, 356) can have a larger antenna gain than the antennas that operate in the 2.4 GHz band (i.e., 340, 350, 352). For example, the 2.4 GHz antennas can achieve a maximum antenna gain of 3 dBi, and the 5 GHz antennas can achieve a maximum antenna gain of 5 dBi. Thus, when a wireless communication device capable of operating in both the 5.0 GHz and 2.4 GHz bands attempts to communicate with the access point 300, the wireless communication device is likely to receive a signal in the 5.0 GHz band from the access point 300, which has a RSSI equal to or higher than a RSSI of another signal in the 2.4 GHz band received from the access point 300. As a result, the wireless communication device can be steered or moved to the 5.0 GHz band.

FIG. 20 is a schematic illustration of embodiment of an access point device that includes a band steering approach that uses antenna location optimization to increase the performance of the 5.0 GHz band, and therefore, a shift to the 5.0 GHz band will become desirable. An access point 400 can be configured the same as or similar to, and function the same as or similar to the access point 100 described above. The access point 400 can be, for example, a multiple output (MIMO) access point that is enabled to operate concurrently in both the 2.4 GHz band (e.g., 802.11b/g/n) and the 5.0 GHz band (e.g., 802.11a/n). The access point 400 includes an enclosure 432 that can be mounted, for example, to a ceiling or a wall or other support structure. In this embodiment, the access point 400 includes six internal antennas mounted within the enclosure 432.

Specifically, the access point 400 includes a first antenna 442, a second antenna 454 and a third antenna 456, each configured to operate within the 5.0 GHz band, and a fourth antenna 440, a fifth antenna 450 and a sixth antenna 452 each configured to operate within the 2.4 GHz band. Each of the sixth antennas can be, for example, omnidirectional or directional, and can be, for example, a vertically-polarized antenna or a horizontally-polarized antenna as described above.

As shown in FIG. 20, the first antenna 442 is disposed at a center region (or substantially at the center region, which may or may not include the exact center of the enclosure 432) of the access point 400 and each of the second antenna 454 and the third antenna 456 of the three 5.0 GHz antennas is disposed near or at an edge portion of the enclosure 432. Each of the fourth antenna 442, the fifth antenna 450 and the sixth antenna 452 is disposed at or near an edge portion of the enclosure 432. Thus, in this embodiment, a 5.0 GHz antenna (first antenna 442) is disposed at the prime location within the access point 400 and will have a greater performance than the 2.4 GHz antennas, which will have only sub-optimal performance based on their location within the access point 400. In this example embodiment, the performance of the 2.4 GHz antennas can be sacrificed to further improve the performance of the 5.0 GHz antennas. In some embodiments, such positioning of a 5.0 GHz antenna at the prime location can cause the 5.0 GHz antennas to perform four times better than the 2.4 GHz antennas.

As described herein, the internal antennas of an access point (100, 200, 300, 400) are configured to support spatial diversity, pattern diversity, as well as polarization diversity. In some embodiments, the internal antennas of access point (100, 200, 300, 400) can be configured to support, for example, cross-band isolation. Such embodiments can improve the performance of dual concurrent 2.4 GHz and 5 GHz access point with farther range, throughput, and coverage. In some embodiments, for example, the 2.4 GHz antennas can achieve a maximum gain of 3 dBi, and the 5 GHz antennas can achieve a maximum gain of 5 dBi.

Some of the embodiments of an access point device described herein refer to horizontal and vertical polarization. In an alternative embodiment, an access point can include one or more antennas that have a circular polarization. Such an antenna can send and receive an electromagnetic wave having a rotating electric field. For example, the electric field of the radio wave can rotate either clockwise or counterclockwise to provide different orientations of polarization within an access point in a similar manner as using a combination of antennas having a horizontal orientation and a vertical orientation.

Thus, polarization diversity can alternatively be achieved using antennas with circular polarization or various combinations of antennas with circular polarization, horizontal polarization and vertical polarization. In yet other embodiments, an access point can include one or more antennas that have an elliptical polarization.

Some embodiments of an access point device described herein include omnidirectional antennas. In alternative embodiments, an access point device as described herein can include other type(s) of antennas that are not omnidirectional and/or a combination of omnidirectional and non-omnidirectional antennas. For example, other types of antennas can include a directional antenna, a patch antenna, etc.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, an access point as described herein can include one or more features and/or functions that support band steering as described herein. Thus, although a particular embodiment may be described as providing band steering through the use of amplifiers, or higher antenna gain 5.0 GHz antennas or antenna location optimization, it should be understood that an access point can include any one of such approaches or a combination of more than one of such approaches.

What is claimed is:

1. An apparatus, comprising:
a processor disposed within an enclosure, the processor configured to communicate with a plurality of wireless devices including a wireless device;
a first antenna disposed within the enclosure, the first antenna configured to operate within a first band; and
a second antenna disposed within the enclosure at a non-zero distance from the first antenna, the second antenna configured to operate within a second band, the second band having a center frequency less than a center frequency of the first band,
the first antenna configured to send a signal having a signal strength at the wireless device and associated with the first band, the second antenna configured to send a signal having a signal strength at the wireless device and associated with the second band, the signal strength for the signal associated with the first band being greater than the signal strength for the signal associated with the second band such that the wireless device selects the first band to communicate with the processor.

2. The apparatus of claim 1, wherein the signal strength for the signal associated with the first band is at least two times the signal strength for the signal associated with the second band.

3. The apparatus of claim 1, wherein the signal strength for the signal associated with the first band is up to four times greater than the signal strength for the signal associated with the second band.

4. The apparatus of claim 1, wherein a gain of the first antenna is 5 dBi and a gain of the second antenna is 3 dBi.

5. The apparatus of claim 1, wherein a ratio of a gain of the first antenna to a gain of the second antenna is greater than 1.

6. The apparatus of claim 1, further comprising:
a first amplifier disposed within the enclosure and configured to amplify a signal sent to the first antenna, the first antenna configured to send the signal associated with the first band based on the signal sent to the first antenna; and
a second amplifier disposed within the enclosure and configured to amplify a signal sent to the second antenna, the second antenna configured to send the signal associated with the second band based on the signal sent to the second antenna,
the first amplifier having a higher amplification than an amplification of the second amplifier.

7. The apparatus of claim 1, further comprising:
a third antenna configured to operate within the first band, a fourth antenna configured to operate within the first band, a fifth antenna configured to operate within the second band and a sixth antenna configured to operate within the second band,
the first antenna being a horizontally-polarized antenna, the third antenna being a horizontally-polarized antenna, and the fourth antenna being a vertically-polarized antenna,
the second antenna being a horizontally-polarized antenna, the fifth antenna being a horizontally-polarized antenna, and the sixth antenna being a vertically-polarized antenna.

8. The apparatus of claim 1, further comprising:
a third antenna configured to operate within the first band, a fourth antenna configured to operate within the first band, a fifth antenna configured to operate within the second band and a sixth antenna configured to operate within the second band, the first antenna being a vertically-polarized antenna, the third antenna being a vertically-polarized antenna, and the fourth antenna being a horizontally-polarized antenna, the second antenna being a vertically-polarized antenna, the fifth antenna being a vertically-polarized antenna, and the sixth antenna being a horizontally-polarized antenna.

9. The apparatus of claim 1, wherein the first band is a 5.0 GHz band and the second band is a 2.4 GHz band.

10. An apparatus, comprising:
a processor disposed within an enclosure, the processor configured to communicate with a plurality of wireless devices including a wireless device;
a first antenna disposed within the enclosure and configured to operate within a first band; and
a second antenna disposed within the enclosure and configured to operate within a second band,
the first antenna disposed within the enclosure at a central region of the enclosure and the second antenna disposed within the enclosure adjacent an edge portion of the enclosure such that a signal sent from the first antenna has a signal strength at the wireless device greater than a signal strength at the wireless device of a signal sent from the second antenna such that the wireless device selects the first band to communicate with the processor.

11. The apparatus of claim 10, wherein the first band is a 5.0 GHz band and the second band is a 2.4 GHz band.

12. The apparatus of claim 10, wherein the first antenna has a gain greater than a gain of the second antenna.

13. The apparatus of claim 10, wherein the signal strength associated with the first band is up to four times greater the signal strength associated with the second band.

14. The apparatus of claim 10, wherein the signal strength associated with the first band is at least two times the signal strength associated with the second band.

15. The apparatus of claim 10, wherein a gain of the first antenna is 5 dBi and a gain of the second antenna is 3 dBi.

16. The apparatus of claim 10, wherein a ratio of a gain of the first antenna to a gain of the second antenna is greater than 1.

17. An apparatus, comprising:
a processor disposed within an enclosure, the processor configured to communicate with a plurality of wireless devices including a wireless device;
a first antenna disposed within the enclosure and configured to operate within a first band;
a second antenna disposed within the enclosure at a non-zero distance from the first antenna and configured to operate within a second band;
a first amplifier disposed within the enclosure and configured to amplify a signal sent to the first antenna, the first antenna configured to send a signal associated with the first band based on the signal sent to the first antenna; and
a second amplifier disposed within the enclosure and configured to amplify a signal sent to the second antenna, the second antenna configured to send a signal associated with the second band based on the signal sent to the second antenna,
the first amplifier having a higher amplification than an amplification of the second amplifier, a signal strength associated with the first band at the wireless device being greater than a signal strength associated with the second band at the wireless device such that the wireless device selects the first band to communicate with the processor.

18. The apparatus of claim 17, wherein a signal strength associated with the first band is up to four times greater than a signal strength associated with the second band at the wireless device.

19. The apparatus of claim 17, wherein the signal strength associated with the first band at the wireless device is at least two times a signal strength associated with the second band at the wireless device.

20. The apparatus of claim 17, wherein the first antenna has a gain greater than a gain of the second antenna.

21. The apparatus of claim 17, wherein a gain of the first antenna is 5 dBi and a gain of the second antenna is 3 dBi.

22. The apparatus of claim 17, wherein a ratio of a gain of the first antenna to a gain of the second antenna is greater than 1.

23. The apparatus of claim 17, wherein the first antenna is disposed within the enclosure at a central region of the enclosure and the second antenna is disposed within the enclosure adjacent an edge portion of the enclosure.

* * * * *